US010421026B2

(12) United States Patent
Hashemi et al.

(10) Patent No.: US 10,421,026 B2
(45) Date of Patent: *Sep. 24, 2019

(54) ASSEMBLY WITH TOY CHARACTER IN HOUSING

(71) Applicant: SPIN MASTER LTD., Toronto (CA)

(72) Inventors: Hamid R. Hashemi, Mississauga (CA); Anne N. Charbonneau, North York (CA); Victor Lai, Unionville (CA)

(73) Assignee: SPIN MASTER LTD., Toronto (CA)

( * ) Notice: Subject to any disclaimer, the term of this patent is extended or adjusted under 35 U.S.C. 154(b) by 64 days.

This patent is subject to a terminal disclaimer.

(21) Appl. No.: 15/673,846

(22) Filed: Aug. 10, 2017

(65) Prior Publication Data

US 2017/0333801 A1 Nov. 23, 2017

Related U.S. Application Data

(63) Continuation of application No. 15/257,877, filed on Sep. 6, 2016, now Pat. No. 9,757,659, which is a continuation of application No. 15/199,341, filed on Jun. 30, 2016, now abandoned, which is a continuation-in-part of application No. 14/884,191, filed on Oct. 15, 2015, now Pat. No. 9,550,128.

(51) Int. Cl.
| | | |
|---|---|---|
| A63H 3/36 | (2006.01) | |
| C08K 5/098 | (2006.01) | |
| A63H 29/22 | (2006.01) | |
| C08K 3/26 | (2006.01) | |
| A63H 3/00 | (2006.01) | |
| A63H 3/50 | (2006.01) | |
| A63H 3/52 | (2006.01) | |
| A63H 13/02 | (2006.01) | |
| A63H 13/03 | (2006.01) | |

(52) U.S. Cl.
CPC ............... *A63H 3/36* (2013.01); *A63H 3/006* (2013.01); *A63H 3/50* (2013.01); *A63H 3/52* (2013.01); *A63H 13/02* (2013.01); *A63H 13/03* (2013.01); *A63H 29/22* (2013.01); *C08K 3/26* (2013.01); *C08K 5/098* (2013.01); *A63H 2200/00* (2013.01); *C08K 2003/265* (2013.01)

(58) Field of Classification Search
CPC .......... A63H 3/52; A63H 13/02; A63H 13/03; C08K 2003/265; C08K 5/098
See application file for complete search history.

(56) References Cited

U.S. PATENT DOCUMENTS

| | | |
|---|---|---|
| 608,794 A | 8/1898 | Quinn |
| 685,345 A | 10/1901 | Perkins et al. |
| 722,731 A | 3/1903 | Mackaye |
| 1,237,954 A | 8/1917 | Prevost |
| 3,005,284 A | 10/1961 | Angelo |
| 3,091,053 A | 5/1963 | Growald |
| 4,237,648 A | 12/1980 | Goldfarb |
| 4,259,805 A | 4/1981 | Hornsby, Jr. |
| D276,705 S | 12/1984 | Oliveri |
| 4,591,345 A | 5/1986 | Kohner |
| 4,736,943 A | 4/1988 | Fukuda |
| 4,817,936 A | 4/1989 | Matsuda |
| 4,836,821 A | 6/1989 | Raymond |
| 4,881,915 A | 11/1989 | Liaw |
| D308,938 S | 7/1990 | Van Erkel |
| D312,845 S | 12/1990 | Matsuda |
| D318,240 S | 7/1991 | Pang |
| 5,795,209 A | 8/1998 | Moore |
| 5,813,895 A | 9/1998 | Cho |
| D406,053 S | 2/1999 | Ying |
| 5,989,092 A | 11/1999 | McGowan |
| D442,650 S | 5/2001 | Allen |
| 6,231,346 B1 | 5/2001 | Sagi-Dolev |
| 6,250,985 B1 | 6/2001 | Nicholson |
| 6,592,426 B2 | 7/2003 | Mesch |
| D478,134 S | 8/2003 | Yuan |
| 6,702,644 B1 | 3/2004 | Hornsby |
| D532,463 S | 11/2006 | Boutin |
| D789,241 S | 6/2017 | Cao |
| D801,621 S | 11/2017 | Ensslen |
| 2001/0034178 A1 | 10/2001 | Spector |
| 2004/0127140 A1 | 7/2004 | Kelly et al. |
| 2006/0030236 A1 | 2/2006 | Ueno et al. |
| 2007/0173170 A1 | 7/2007 | Wu |
| 2008/0014831 A1 | 1/2008 | Rettberg et al. |

FOREIGN PATENT DOCUMENTS

| | | |
|---|---|---|
| CN | 2135170 Y | 6/1993 |
| CN | 2299836 Y | 12/1998 |
| CN | 2313646 Y | 4/1999 |
| CN | 2750846 Y | 1/2006 |
| CN | 2834651 Y | 11/2006 |

(Continued)

OTHER PUBLICATIONS

ZL201720006260.9, Utility Model Patent Evaluation Report, Chinese State Intellectual Property Office, Sep. 11, 2017.
ZL201621220601.4, Utility Model Patent Evaluation Report, Chinese State Intellectual Property Office, Sep. 11, 2017.
CN2016109010760, Search Report, Chinese State Intellectual Property Office, dated May 17, 2018.
U.S. Appl. No. 15/935,280, Non-Final Office Action, USPTO, dated May 25, 2018.
EP17199571.5, Partial European Search Report, dated Oct. 26, 2018, European Patent Office.

(Continued)

*Primary Examiner* — Wenwen Cai
(74) *Attorney, Agent, or Firm* — Millman IP Inc.

(57) ABSTRACT

In an aspect, a toy character assembly is provided, and includes a housing, a toy character inside the housing and a breakout member that is operable to break the housing to expose the toy character. The housing is formed from a composition comprising 15-24 weight-% ethylene-vinyl acetate; 1-5 weight-% zinc stearate; and 75-84 weight-% calcium carbonate.

14 Claims, 22 Drawing Sheets

(56) References Cited

FOREIGN PATENT DOCUMENTS

| | | |
|---|---|---|
| CN | 102 078 697 A | 6/2011 |
| CN | 102475981 A | 5/2012 |
| CN | 202478611 U | 10/2012 |
| CN | 103160098 A | 6/2013 |
| FR | 1164900 A | 10/1958 |
| FR | 2 554 360 A1 | 5/1985 |
| GB | 2189710 A | 11/1987 |
| GB | 2355940 A | 5/2001 |
| GB | 2367766 A | 4/2002 |
| JP | 197314427 B | 5/1973 |
| JP | S61-87225 U | 12/1987 |
| JP | H02252482 A | 10/1990 |
| JP | 02-141495 U | 11/1990 |
| JP | 03-007886 U | 1/1991 |
| JP | H02-141495 U1 | 11/1991 |
| JP | 10-286382 A | 10/1998 |
| JP | 2002-224463 A | 8/2002 |
| JP | 2004-035829 A | 2/2004 |
| JP | 2009095283 A | 5/2009 |
| JP | 2012 157565 A | 8/2012 |
| KR | 10-2002-0062182 A | 7/2002 |
| KR | 200386793 Y1 | 6/2005 |
| WO | 2004/041388 A1 | 5/2004 |
| WO | 2010/045268 A2 | 4/2010 |

OTHER PUBLICATIONS

EP17199604.4, European Search Report, dated Oct. 26, 2018, European Patent Office.
AU2017219164, Examination Report, dated Oct. 31, 2018, IP Australia.
EP17199604.4, European Examination Report, dated Nov. 26, 2018, European Patent Office.
KR10-2018-935634, Office Action, dated Nov. 27, 2018, Korean Intellectual Property Office.
EP 17207495.7, European Search Report, European Patent Office, dated May 23, 2018.
U.S. Appl. No. 15/199,341, Non-Final Office Action, USPTO, dated Jun. 20, 2018.
EP 17199571.5, Article 94(3) EPC Communication, dated Mar. 13, 2019, European Patent Office.
CN 2016109010760, Office Action & English machine translation, dated Dec. 25, 2018, China National Intellectual Property Administration.
Li et al., Product Design Engineering, dated Nov. 30, 2014.
JP 2016-253210, Final Office Action, Japanese Patent Office, dated Nov. 14, 2017.
JP 2016-253210, Final Office Action—English translation, Japanese Patent Office, dated Nov. 14, 2017.
Mitsuishi, K. et al., "Mechanical properties of polyethylene/ethylene vinyl acetate tilled with calcium carbonate", Polymer Composites (Impact Factor: 1.63). Apr. 1988; 9(2). DOI: 10.1002/pc.750090203, abstract accessed Jan. 29, 2016.
U.S. Appl. No. 14/884,191, Non-Final Office Action, dated Oct. 28, 2016, USPTO.
EP 16193072.2, Partial European Search Report, European Patent Office dated Jun. 22, 2017.
JP 2016-253210, Japanese Office Action & English Translation, Japanese Patent Office dated Jun. 6, 2017.
EP 18162651.6, Partial European Search Report, dated Jun. 3, 2019, European Patent Office.
JP 2018-072842, Office Action & English translation thereof, dated May 28, 2019, Japanese Patent Office.
EP 18164055.8, European Search Report, dated Jun. 6, 2019, European Patent Office.

ASSEMBLY WITH TOY CHARACTER IN HOUSING

CROSS-REFERENCE TO RELATED APPLICATIONS

This application is a continuation of U.S. application Ser. No. 15/257,877 filed Sep. 6, 2016 which is a continuation of U.S. application Ser. No. 15/199,341 filed Jun. 30, 2016, which is a continuation-in-part application of U.S. application Ser. No. 14/884,191 filed Oct. 15, 2015, the contents of which are hereby incorporated by reference as if set forth fully herein.

FIELD

The specification relates generally to toy characters, and more particularly to toy characters in a housing shaped like an egg.

BACKGROUND OF THE DISCLOSURE

There is a continuing desire to provide toys that interact with a user, and for the toys to reward the user based on the interaction. For example, some robotic pets will show simulated love if their owner pats their head several times. While such robotic pets are enjoyed by their owners, there is a continuing desire for new and innovative types of toys and particularly toy characters that interact with their owner.

SUMMARY OF THE DISCLOSURE

In an aspect, a toy character assembly is provided, and includes a housing, a toy character, at least one sensor and a controller. The toy character is positioned inside the housing and includes a breakout mechanism that is operable to break the housing to expose the toy character. The at least one sensor detects interaction with a user. The controller is configured to determine whether a selected condition has been met based on at least one interaction with the user, and to operate the breakout mechanism to break the housing to expose the toy character if the condition is met. Optionally, the condition is met based upon having a selected number of interactions with the user.

According to another aspect, a method is provided for managing an interaction between a user and a toy character assembly, wherein the assembly includes a housing and a toy character inside the housing. The method includes:

a) receiving from the user a registration of the toy character assembly;

b) receiving from the user after step a), a first progress scan of the toy character assembly;

c) displaying a first output image of the toy character in a first stage of virtual development;

d) receiving from the user after step c), a second progress scan of the toy character assembly; and e) displaying a second output image of the toy character in a second stage of virtual development that is different than the first output image.

In another aspect, a toy character assembly is provided. The toy character assembly includes a housing, a toy character inside the housing, a breakout mechanism that is associated with the housing and that is operable to break the housing to expose the toy character. The breakout mechanism is powered by a breakout mechanism power source that is associated with the housing. Optionally, the breakout mechanism is inside the housing. As a further option, the breakout mechanism may be operable from outside the housing. Optionally, the breakout mechanism includes a hammer, positioned in association with the toy character, wherein the breakout mechanism power source is operatively connected to the hammer to drive the hammer to break the housing. Optionally, the breakout mechanism power source is operatively connected to the hammer to reciprocate the hammer to break the housing.

In another aspect, a toy character assembly is provided, and includes a housing and a toy character inside the housing, wherein the housing has a plurality of irregular fracture paths formed therein, such that the housing is configured to fracture along at least one of the fracture paths when subjected to a sufficient force.

In another aspect, a toy character assembly is provided, and includes a housing and a toy character inside the housing in a pre-breakout position. The toy character includes a functional mechanism set. The toy character is removable from the housing and is positionable in a post-breakout position. When the toy character is in the pre-breakout position, the functional mechanism set is operable to perform a first set of movements. When the toy character is in the post-breakout position, the functional mechanism set is operable to perform a second set of movements that is different than the first set of movements. In an example, the toy character further includes, a breakout mechanism, a breakout mechanism power source, at least one limb and a limb power source that all together form part of the functional mechanism set. When the toy character is in the pre-breakout position, the limb power source is operatively disconnected from the at least one limb, and so movement of the limb power source does not drive movement of the at least one limb. However, in the pre-breakout position, the breakout mechanism power source drives movement of the breakout mechanism so as to break the housing and expose the toy character. When the toy character is in the post-breakout position the limb power source is operatively connected to the at least one limb and can drive movement of the limb, but the breakout mechanism is not driven by the breakout mechanism power source.

In another aspect, a polymer composition is provided, the polymer composition including about 15-25 weight-% base polymer; about 1-5 weight-% organic acid metal salt; and about 75-85 weight-% inorganic/particulate filler.

In another aspect, an article of manufacture is provided, the article of manufacture formed of the polymer composition including about 15-25 weight-% base polymer; about 1-5 weight-% organic acid metal salt; and about 75-85 weight-% inorganic/particulate filler.

In another aspect, a toy character assembly is provided and includes a housing, and a toy character inside the housing, wherein the toy character includes a breakout mechanism that is operable to break the housing to expose the toy character, and wherein the housing includes a plurality of fracture elements provided on an inside face thereof to facilitate fracture upon impact from the breakout mechanism.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1A:
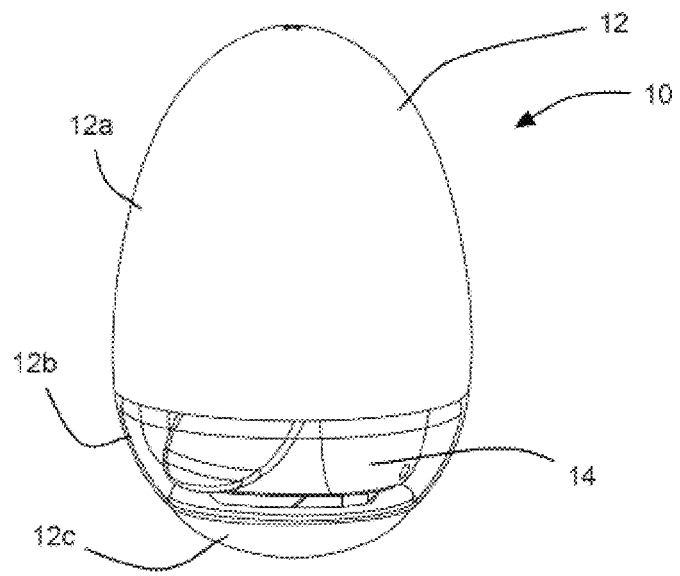
FIGS. 1a and 1b are transparent side view of a toy character assembly according to a non-limiting embodiment.
Figure 1B:
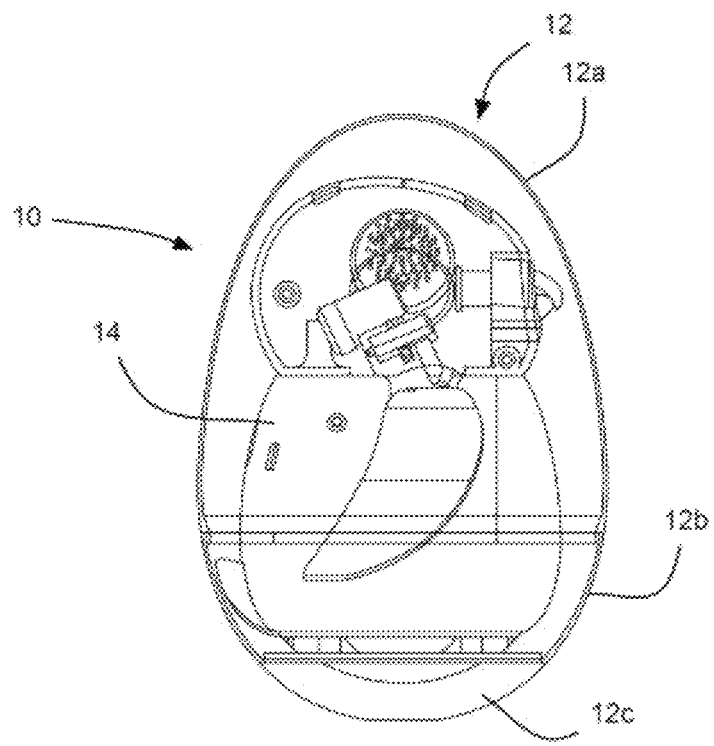

Reference is made to FIGS. 1a and 1b, which show a toy character assembly 10 in accordance with an embodiment of the present disclosure. The toy character assembly 10 includes a housing 12 and a toy character 14 that is positioned in the housing 12. For the purposes of showing the toy character 14 inside the housing 12, parts of the housing 12 are shown as transparent in FIGS. 1a and 1b, however the housing 12 may, in the physical assembly, be opaque in the sense that, under typical ambient lighting conditions, the toy character 14 would be not visible to a user through the housing 12. In the embodiment shown, the housing 12 is in the form of an egg shell and the toy character 14 inside the housing 12 is in the form of a bird. However, the housing 12 and toy character 14 may have any other suitable shapes. For manufacturing purposes, the housing 12 may be formed from a plurality of housing members, individual shown as a first housing member 12a, a second housing member 12b and a third housing member 12c, which are fixedly joined together so as to substantially enclose the toy character 14. In some embodiments the housing 12 could alternatively only partially enclose the toy character 14 so that the toy character could be visible from some angles even when it is inside the housing 12.

The toy character 14 is configured to break the housing 12 from within the housing 12, as to expose the toy character 14. In embodiments in which the housing 12 is in the form of an egg, the act of breaking the housing 12 will appear to the user as if the toy character 14 is hatching from the egg, particular in embodiments in which the toy character 14 is in the form of a bird, or some other animal that normally hatches from an egg, such as a turtle, a lizard, a dinosaur, or some other animal.

Figure 2:
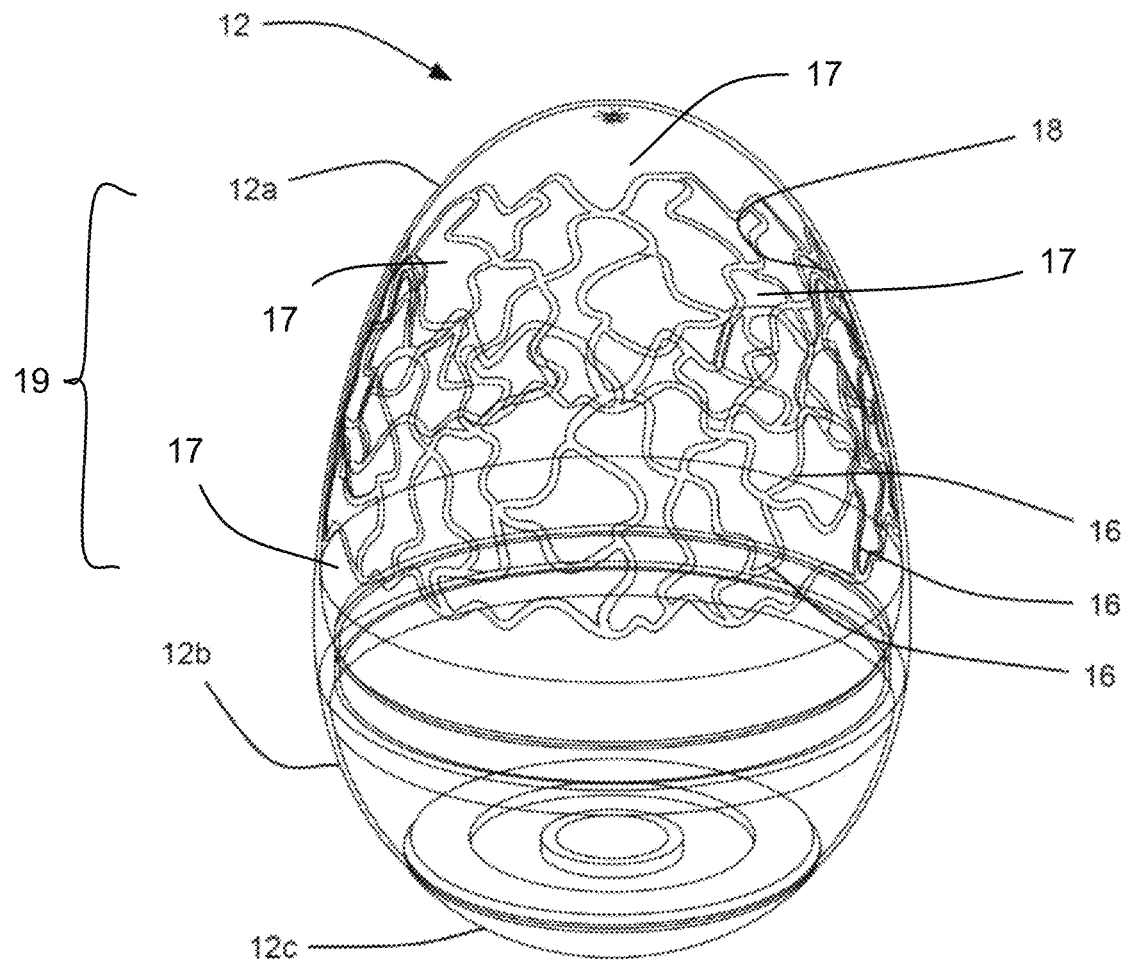
FIG. 2 is a transparent, perspective view of a housing that is part of the toy character assembly shown in FIGS. 1a and 1b.

Referring to the transparent view in FIG. 2, the housing 12 may include a plurality of irregular fracture paths 16 formed therein. As a result, when the toy character 14 breaks the housing 14 it appears to the user that the housing 12 has been broken randomly by the toy character 14, to impart realism to the process of breaking the housing. The irregular fracture paths 16 may have any suitable shape. For example, the fracture paths 16 may be generally arcuate, so as to inhibit the presence of sharp corners in the housing 12 during breakage of the housing 12 by the toy character 14. The irregular fracture paths 16 may be formed in any suitable way. For example, the fracture paths may be molded directly into one or more of the housing members 12a-12c. In the example shown, the fracture paths 16 are provided on the inside face (shown at 18) of the housing 12 so as to not be visible to the user prior to breakage of the housing 12. As a result of the fracture paths 16, the housing 12 is configured to fracture along at least one of the fracture paths 16 when subjected to a sufficient force.

The housing 12 may be formed of any suitable natural or synthetic polymer composition, depending on the desired performance (i.e. breakage) properties. When presented in the form of an egg shell, as shown for example in FIG. 1a, the polymer composition may be selected so as to exhibit a realistic breakage behavior upon impact from the breakout mechanism 22 of the toy character 14. In general, suitable materials for a simulated breakable egg shell may exhibit one or more of low elasticity, low plasticity, low ductility and low tensile strength. Upon action by the breakout mechanism 22, the material should fracture, without significant absorption of the impact force. In other words, upon impact by the breakout mechanism 22, the material should not significantly flex, but rather fracture along one or more of the defined fracture elements. In addition, the polymer composition may be selected to demonstrate breakage without the formation of sharp edges. During the breakage event, the selected polymer composition should enable broken and loosened pieces to separate and fall cleanly away from the housing 12, with minimal unrealistic hanging due to flex or bending at undetached points.

It has been determined that polymer compositions having high filler content relative to the base polymer exhibit performance properties desired for simulating a breaking egg shell. An exemplary composition having high filler content may comprise about 15-25 weight-% base polymer, about 1-5 weight-% organic acid metal salt and about 75-85 weight-% inorganic/particulate filler. It will be appreciated that a variety of base polymers, organic acid metal salts and fillers may be selected to achieve the desired performance properties. In one exemplary embodiment suitable for use in forming the housing 12, the composition is comprised of 15-25 weight-% ethylene-vinyl acetate, 1-5 weight-% zinc stearate and 75-85 weight-% calcium carbonate. It will be appreciated that the polymer composition may also include additives to modify and achieve the desired performance properties.

While exemplified using ethylene-vinyl acetate, it will be appreciated that a variety of base polymers may be used depending on the desired performance properties. Alternatives for the base polymer may include select thermoplastics, thermosets and elastomers. For example, in some embodiments, the base polymer may be a polyolefin (i.e. polypropylene, polyethylene). It will be further appreciated that the base polymer may be selected from a range of natural polymers used to produce bioplastics. Exemplary natural polymers include, but are not limited to, starch, cellulose and aliphatic polyesters.

While exemplified using calcium carbonate, it will be appreciated that an alternative particulate filler may be suitably used. Exemplary alternatives may include, but are not limited to, talc, mica, kaolin, wollastonite, feldspar, and aluminum hydroxide.

With reference to FIG. 2, where the housing 12 is provided in the form of an egg shell, the wall thickness in structural regions 17, that is on portions of the housing 12 surrounding the fracture elements (shown in FIG. 2 as fracture paths 16) may be in the range of 0.5 to 1.0 mm. The selected wall thickness may take into account a number of factors, including ease of molding (i.e injection molding), in particular with respect to melt flow performance through the mold tool for a selected polymer composition. For the exemplary polymer composition noted above, that is the composition comprised of 15-25 weight-% ethylene-vinyl acetate, 1-5 weight-% zinc stearate and 75-85 weight-% calcium carbonate, a wall thickness of 0.7 to 0.8 mm for the structural regions 17 may be selected to achieve good molding performance. With this composition, a thickness of 0.7 to 0.8 mm for the structural region 17 has also been found to provide sufficient strength to maintain the integrity of the housing 12 during transport and handling, particularly when being handled by children.

The arrangement of the plurality of fracture paths 16 formed on the inside face 18 of the housing 12 serves to facilitate the process of breaking the housing 12 by the breakout mechanism 22. In a housing 12 provided in the form of a breakable egg shell, the fracture paths 16 are generally provided in a breakage zone 19 of the first housing member 12a. It will be appreciated, however, that the breakage zone 19 may be provided in one or more of the various housing members 12a, 12b, 12c. The fracture paths 16 may be formed in either a random or regular (i.e. geometric) pattern, depending on the desired breakage behavior. Turning to FIGS. 15 to 19b, shown are a number of exemplary fracture elements that may be formed into the housing 12.

Figure 15:
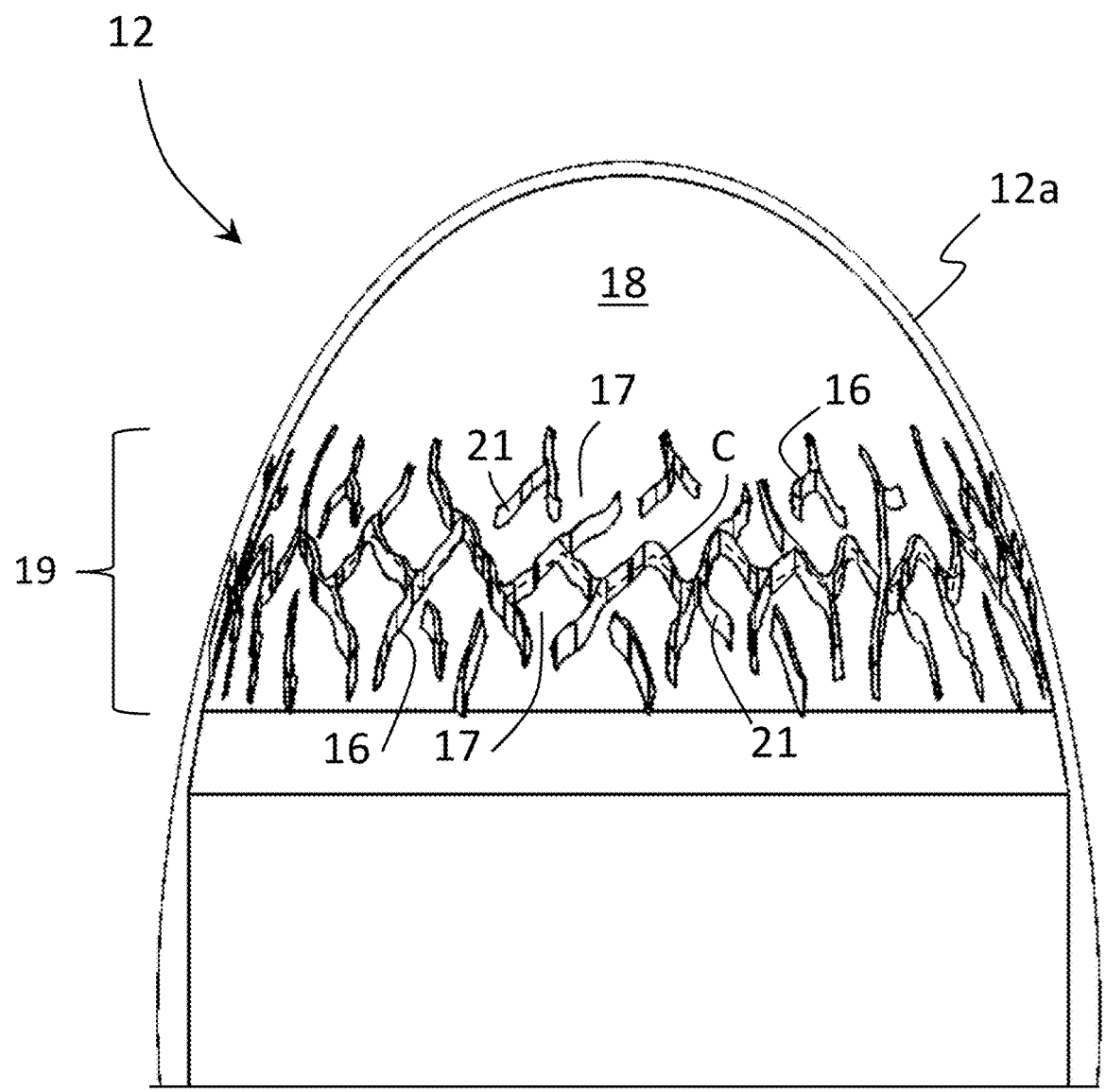
FIG. 15 is a schematic side view of a housing presented in the form of an egg shell having a combination of continuous and discontinuous fracture paths formed therein.

FIG. 15 shows an embodiment where the fracture elements are presented as fracture paths 16 in the breakage zone 19, the fracture paths 16 including a combination of continuous (i.e. interconnected) and discontinuous (i.e. dead-end) channels 21 formed on the inside face 18 of the housing 12. To facilitate breakage, the channels 21 are positioned so as to provide a generally continuous centrally-located fracture path (shown at dotted line C) through the breakage zone 19. The fracture paths 16 define a region of reduced wall thickness, generally 40 to 60% thinner in comparison to the wall thickness of the structural regions 17. In some embodiments, the fracture paths 16 are dimensioned to present a wall thickness that is about 50% thinner than the wall thickness of the surrounding structural region 17. Accordingly, where a housing 12 is provided having a wall thickness of about 0.8 mm in the structural region 17, the fracture paths 16 will generally exhibit a wall thickness of about 0.4 mm. As shown, the width of the channels 21 vary between 0.5 to 1.5 mm along the length thereof, with some channels exhibiting a generally decreasing width towards the terminal (i.e. dead-end) regions thereof. It will be appreciated that channels widths in certain areas may be above or below this range.

Figure 16:
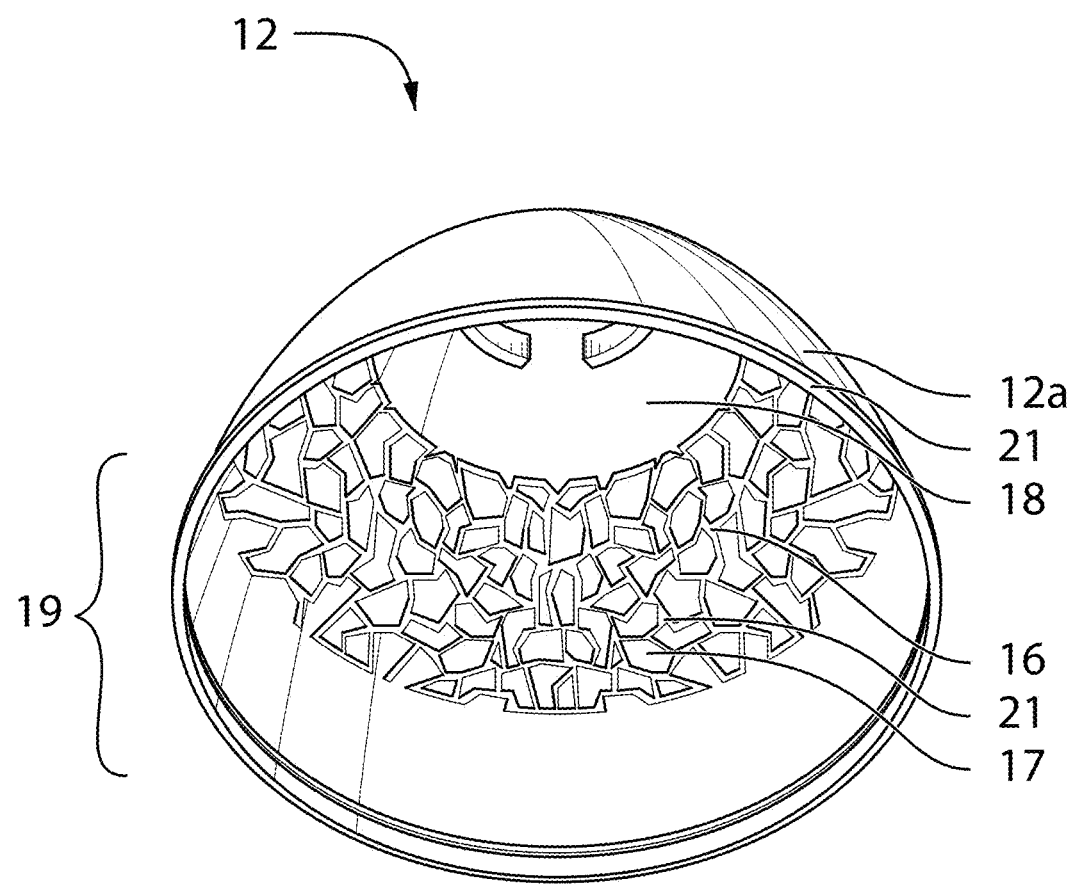
FIG. 16 is a perspective view of a housing presented in the form of an egg shell having a plurality of continuous fracture paths arranged in a random pattern.

FIG. 16 shows an embodiment where the fracture elements are presented as fracture paths 16 in the breakage zone 19, the fracture paths 16 being randomly positioned, and where the channels 21 forming the fracture paths 16 are continuous (i.e. interconnected) therethrough. Similar to the embodiment of FIG. 15, the fracture paths 16 in FIG. 15 define a region of reduced wall thickness, generally 40 to 60% thinner in comparison to the wall thickness of the structural regions 17. In some embodiments, the fracture paths 16 are dimensioned to present a wall thickness that is about 50% thinner than the wall thickness of the surrounding structural region 17. Accordingly, where a housing 12 is provided having a wall thickness of about 0.8 mm in the structural region 17, the fracture paths 16 will generally exhibit a wall thickness of about 0.4 mm. Although the width of the channels 21 may vary, in particular at regions where two or more channels intersect, the channels are formed having a width generally in the range of 0.8 to 1.2 mm. It will be appreciated, however, that channels widths in certain areas may be above or below this range.

Figure 17A:
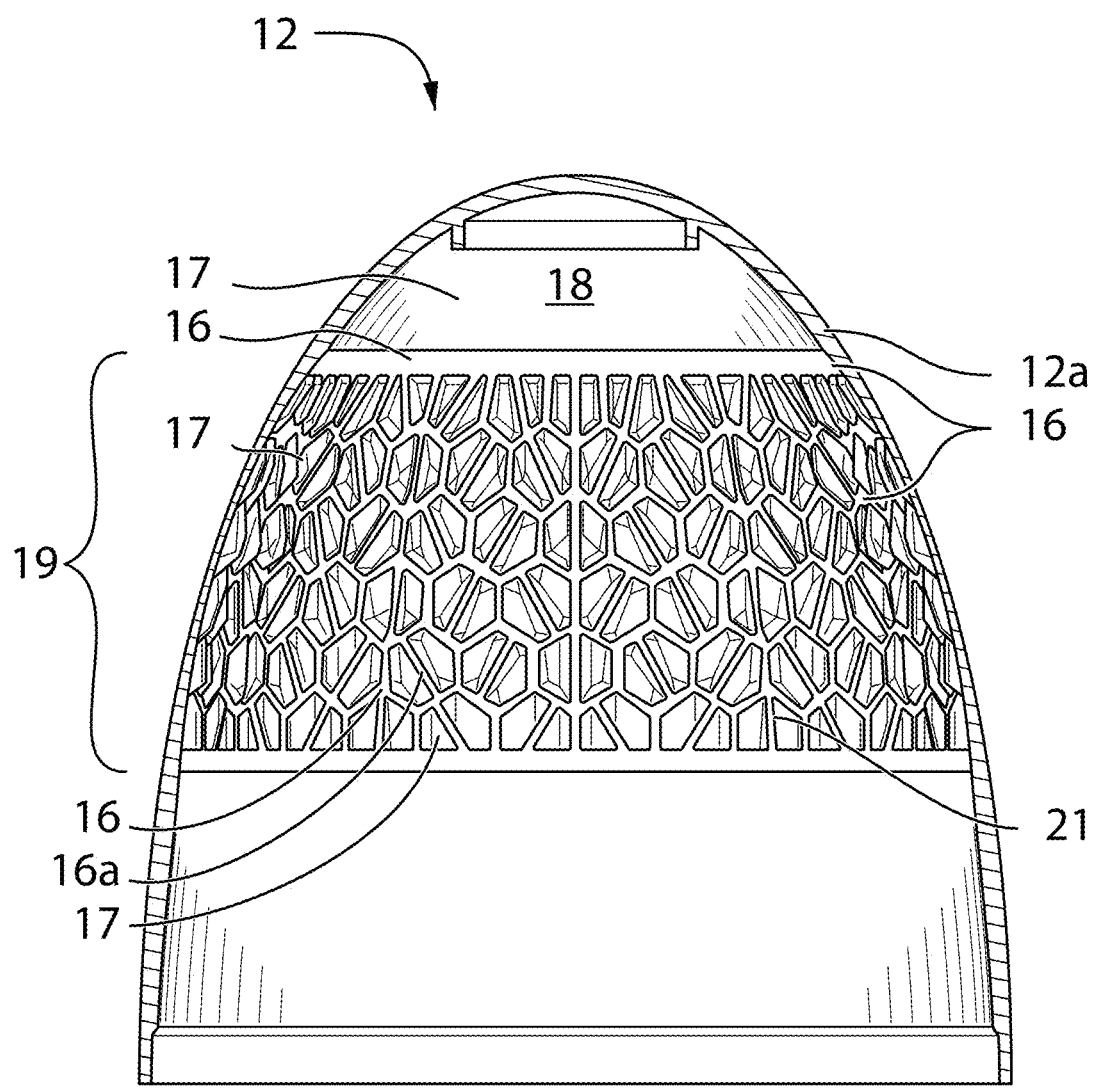
FIG. 17a is a schematic side view of a housing presented in the form of an egg shell having a plurality of continuous fracture paths arranged in a geometric pattern.
Figure 17B:
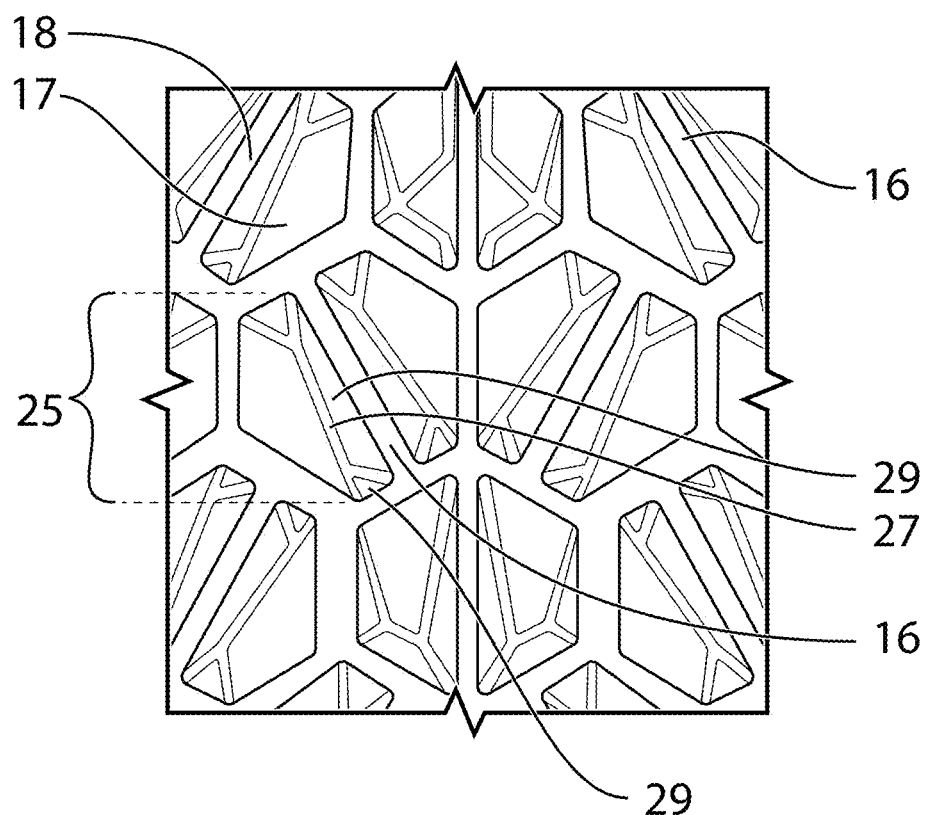
FIG. 17b is perspective view of the housing of FIG. 17a, showing in greater detail the geometric pattern of the fracture paths.

FIG. 17a shows an embodiment where the fracture elements are presented as fracture paths 16 in the breakage zone 19, the fracture paths 16 being arranged in a geometric pattern, and where the channels 21 forming the fracture path 16 are continuous (i.e. interconnected) therethrough. As shown, the geometric pattern includes a plurality of hexagons arranged in a grid, where the perimeter (i.e. sides) of the hexagons define the fracture path 16. Each hexagon is further provided with a central fracture path 16a bisecting the hexagon, either through opposing vertices, or opposing sides. Similar to the embodiment of FIG. 15, the fracture paths 16/16a in FIG. 17a define a region of reduced wall thickness, generally 40 to 60% thinner in comparison to the wall thickness of the structural regions 17. In some embodiments, the fracture paths 16/16a are dimensioned to present a wall thickness that is about 50% thinner than the wall thickness of the surrounding structural region 17. Accordingly, where a housing 12 is provided having a wall thickness of about 0.8 mm in the structural region 17, the fracture paths 16/16a will generally exhibit a wall thickness of about 0.4 mm. Within each geometric shape, the area delimited by the surrounding fracture paths 16 may be formed with uniform wall thickness. In an alternative arrangement, the region 25 delimited by the surrounding fracture paths 16 may be tapered as shown in FIG. 17b. As shown, each region 25 includes a central ridge 27 having a first thickness (i.e. similar to or greater than the thickness of the structural region 17) and a plurality of tapered walls 29 extending from the central ridge 27 in the direction towards an adjacent fracture paths 16. In comparison to the embodiments of FIGS. 15 and 16, the width of the channels 21 is more uniform where the fracture paths 16 are arranged in a geometric pattern. Although the width of the channels may vary, the channels are formed having a width of about 0.8 mm, although embodiments having channel widths either above or below this value are possible.

Figure 18:
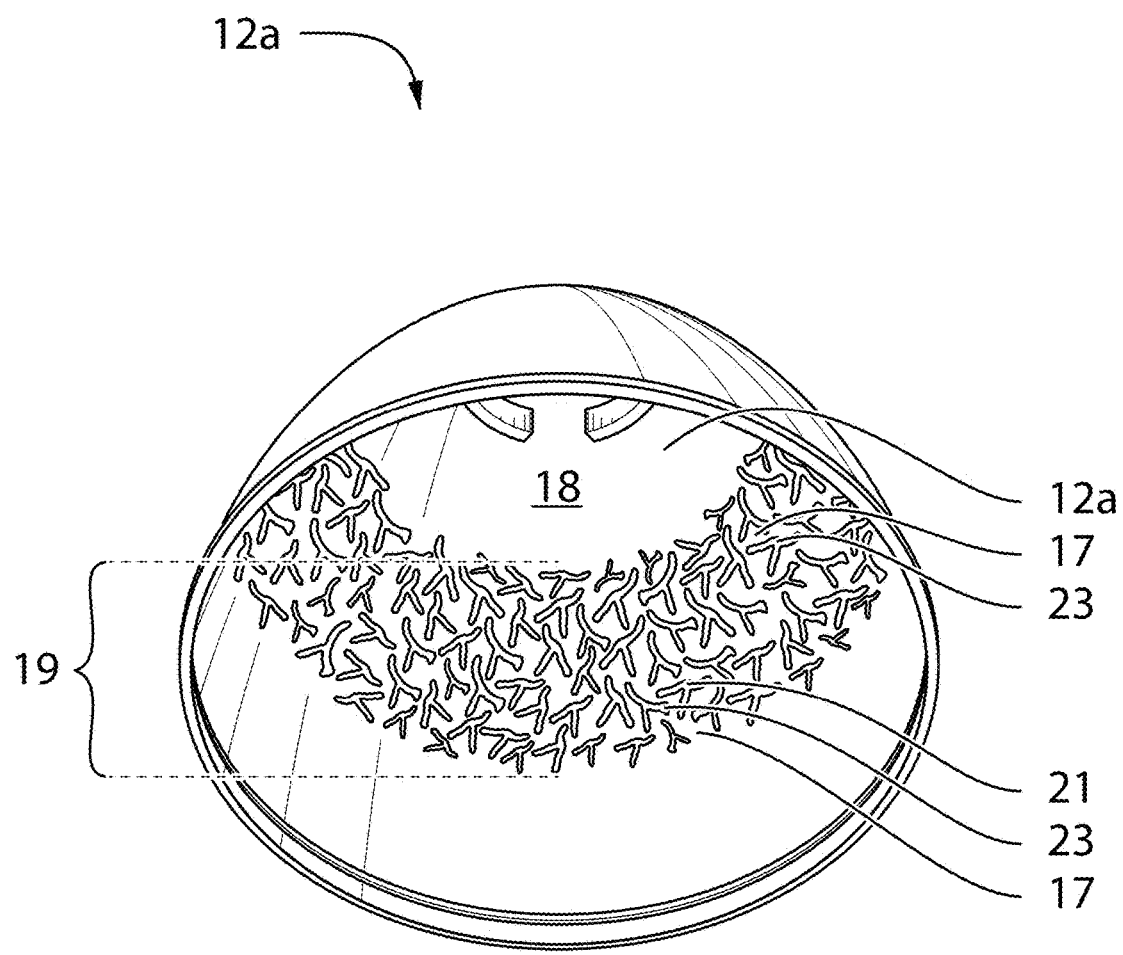
FIG. 18 is perspective view of a housing presented in the form of an egg shell having a plurality of discontinuous fracture paths arranged in a random pattern.

FIG. 18 illustrates an embodiment where the breakage zone 19 includes a series closely associated but discontinuous and randomly positioned fracture elements (shown as fracture units 23). Each fracture unit 23 generally presents in the form of a T- or Y-shaped channel, having a width of 0.5 to 1.5 mm. It will be appreciated that channels widths in certain areas may be above or below this range. It will also be appreciated that the fracture units may present in other forms besides the exemplified T- and Y-shaped channels. For example, in some embodiments, the fracture units may be W-shaped. In some embodiments, the breakage zone 19 may include a variety of differently shaped but otherwise discontinuous fracture units. The fracture unit 23 defines a region of reduced wall thickness, generally in the region of 40 to 60% compared to the wall thickness of the structural regions 17. In some embodiments, the fracture units 23 are dimensioned to present a wall thickness that is about 50% thinner than the wall thickness of the surrounding structural region 17. Accordingly, where a housing 12 is provided having a wall thickness of about 0.8 mm in the structural region 17, the fracture units 23 will generally exhibit a wall thickness of about 0.4 mm.

Figure 19A:
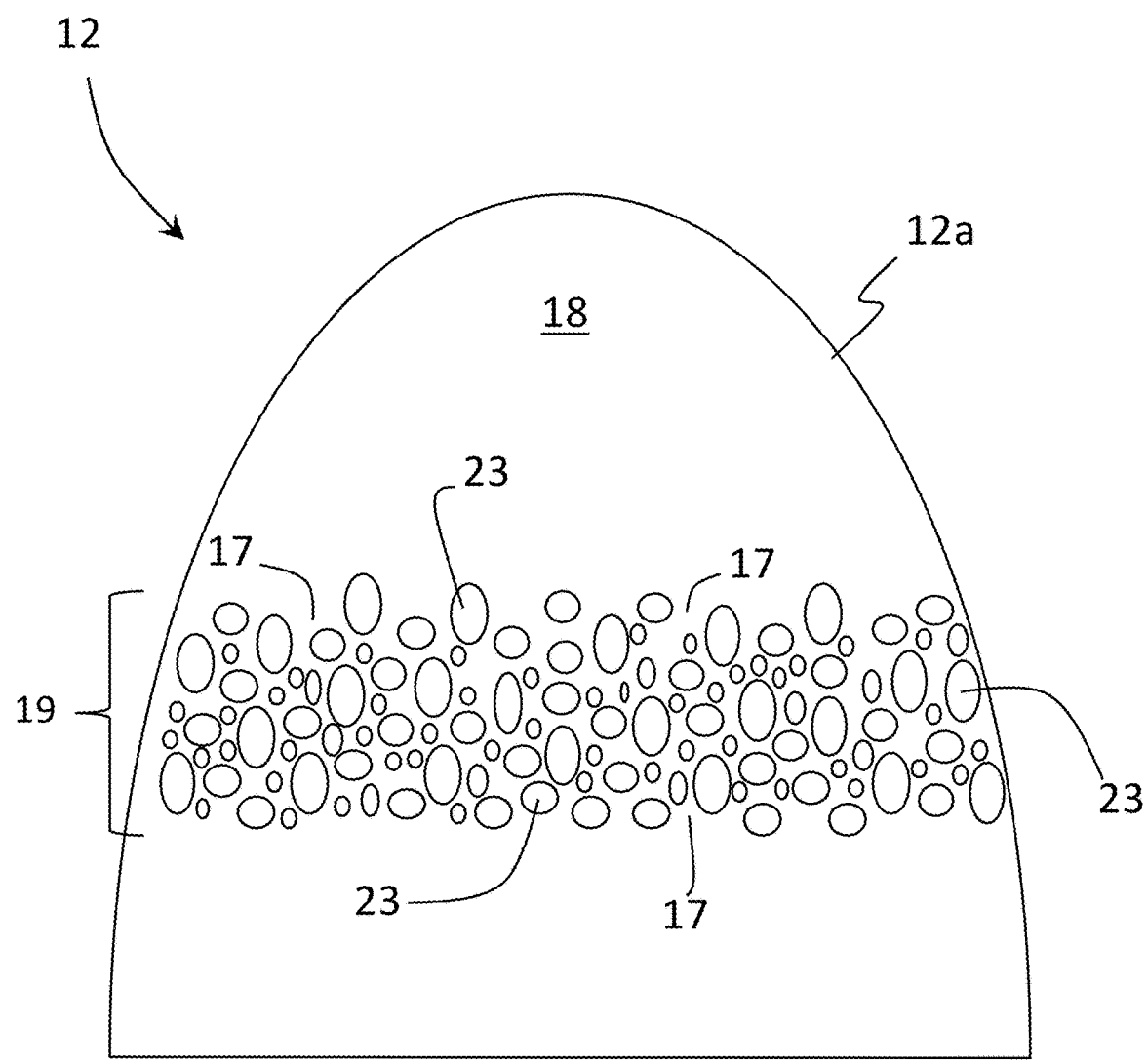
FIG. 19a is a schematic side view of a housing presented in the form of an egg shell having a plurality of fracture units arranged in a random pattern.
Figure 19B:
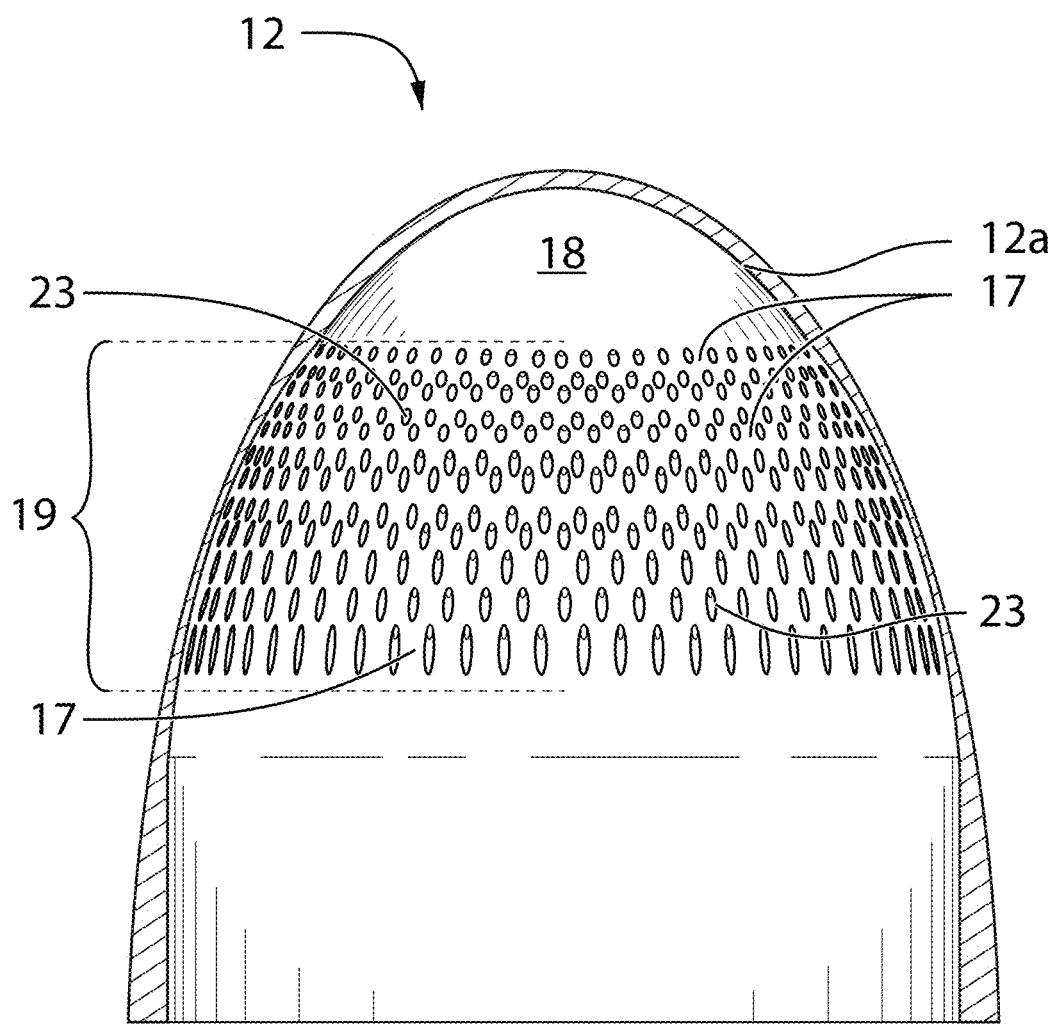
FIG. 19b is perspective view of a housing presented in the form of an egg shell having a plurality of fracture units arranged in a regular repeating pattern.

With reference to FIGS. 19a and 19b, shown are additional alternative embodiments where a discontinuous array of fracture elements are provided to establish the breakage zone 19. FIGS. 19a and 19b present a plurality of fracture elements (shown as fracture units 23) in the form of a circular and/or oval depressions formed in the housing 12. The circular and/or oval fracture units 23 may be provided in various sizes and orientations, to achieve a generally random breakage behavior. For circular fracture units, diameters may range from 1 to 8 mm, although diameters above and below this range are possible. For oval fracture units, length along the oval major axis may range from 2 to 10 mm, while the length along the oval minor axis may present from 5 to 95% of the length of the oval major axis. It will be appreciated that lengths for the major and minor axes may present above or below these values. In addition, the fracture units 23 may be arranged in a generally random pattern, as shown in FIG. 19a, or in a regular repeating pattern as shown in FIG. 19b. The fracture units 23 in FIGS. 19a and 19b define a region of reduced wall thickness, generally 40 to 60% thinner in comparison to the wall thickness of the structural regions 17. In some embodiments, the fracture units 23 are dimensioned to present a wall thickness that is about 50% thinner than the wall thickness of the surrounding structural region 17. Accordingly, where a housing 12 is provided having a wall thickness of about 0.8 mm in the structural region 17, the fracture units 23 will generally exhibit a wall thickness of about 0.4 mm.

The fracture elements (fracture paths 16/ fracture units 23) may account for 20 to 80% of the area within the breakage zone 19. In some embodiments where the housing is required to fracture at a higher impact force, the fracture paths/units may account for 20 to 30% of the area within the breakage zone 19. Conversely, where the housing 12 is required to fracture at a lower impact force, the fracture elements may account for 70% to 80% of the area within the breakage zone 19. In the embodiments shown in FIGS. 15 through 19b, the fracture elements account for 40 to 60% of the area within the breakage zone. In some embodiments, the fracture elements may account for about 50% of the area within the breakage zone. Selection of the proportion of fracture elements relative to the structural region of the housing 12 will consider a number of factors, including, but not limited to, the materials used, the forces required to fracture the housing, as well as the shape of the housing. For example, in an embodiment where the polymer composition incorporates a base polymer having higher strength characteristics compared to ethylene-vinyl acetate, the housing may require a higher proportion of fracture elements (i.e. 70% to 80%) to achieve housing fracture under the same impact conditions. It will be appreciated that other embodiments may incorporate a proportion of fracture elements that may be less than 20%, or greater than 80%, depending on the intended application and the impact forces used to achieve housing fracture.

Although the housing 12 has been exemplified in the form of an egg shell, it will be appreciated that the materials and molding features discussed above may be applied to other articles of manufacture, including but not limited to other housing configurations as well as consumer packaging. For example, where the toy character is provided in the form of an action figure, the housing may be provided in the form of a building, with the action figure being configured to impact the housing from the inside upon being activated. It will be appreciated that a multitude of toy/housing combinations may be possible.

Figure 3:
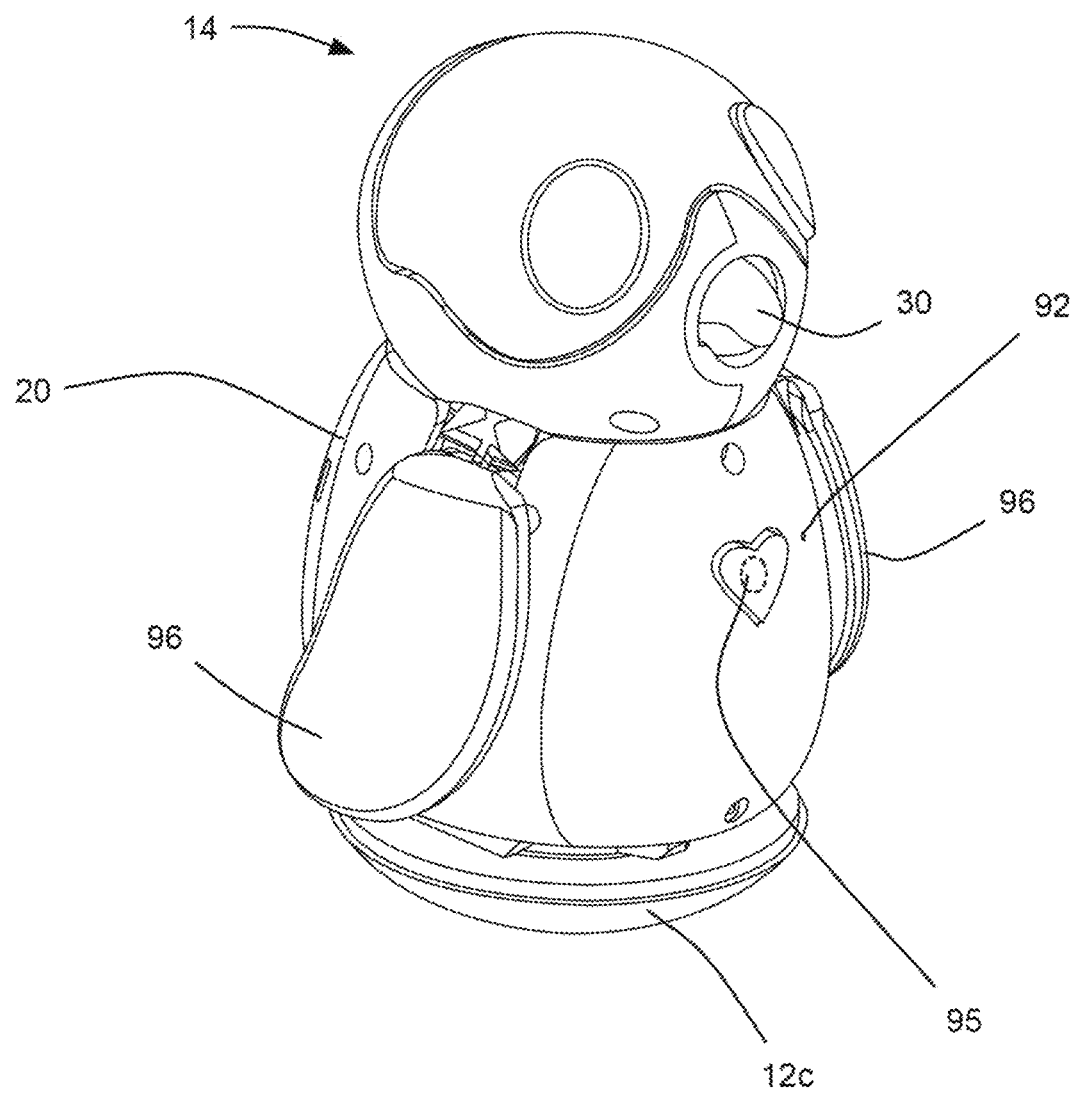
FIG. 3 is a perspective view of a toy character that is part of the toy character assembly shown in FIGS. 1a and 1b.
Figure 4:
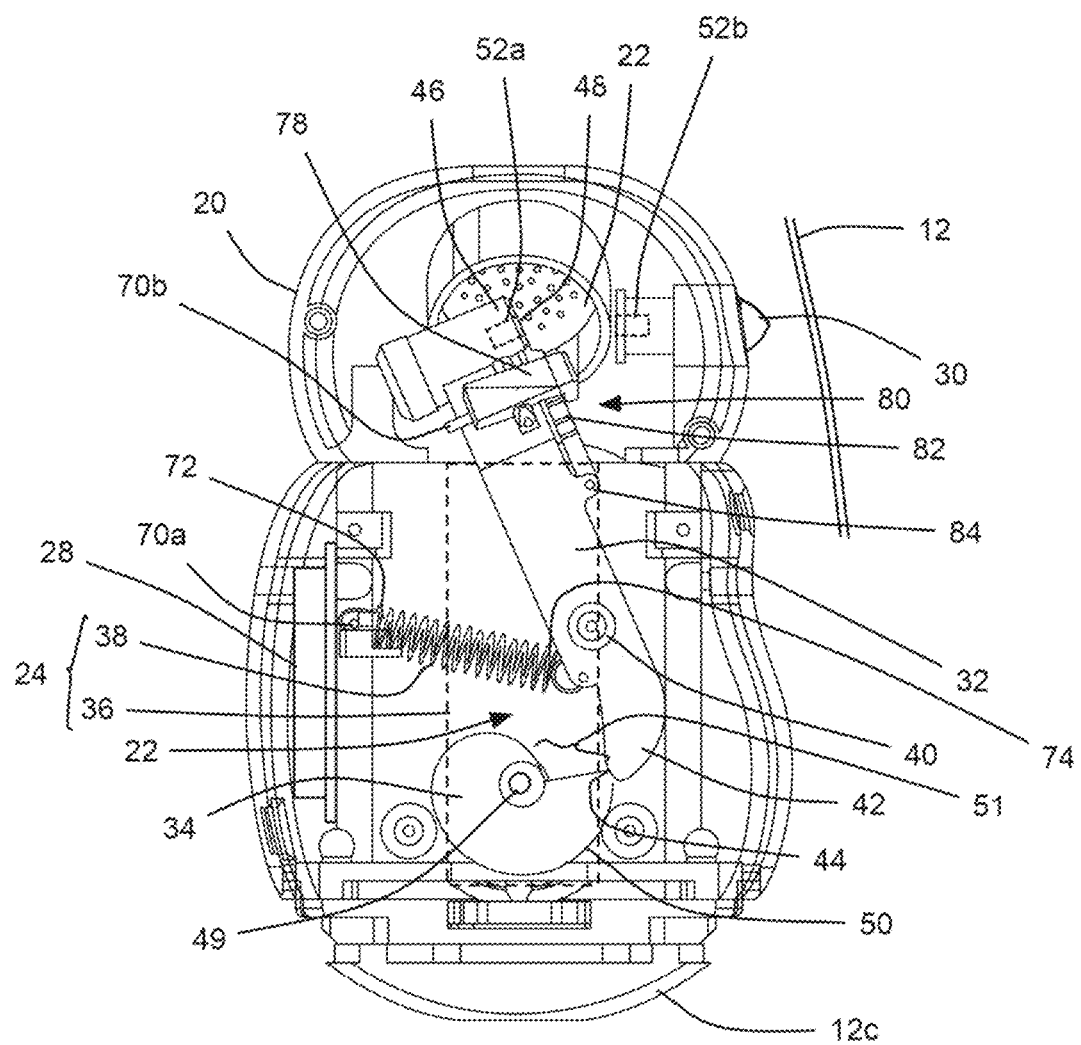
FIG. 4 is a sectional side view of the toy character shown in FIG. 2, in a pre-breakout position, prior to engagement of a hammer that is part of a breakout mechanism.
Figure 5:
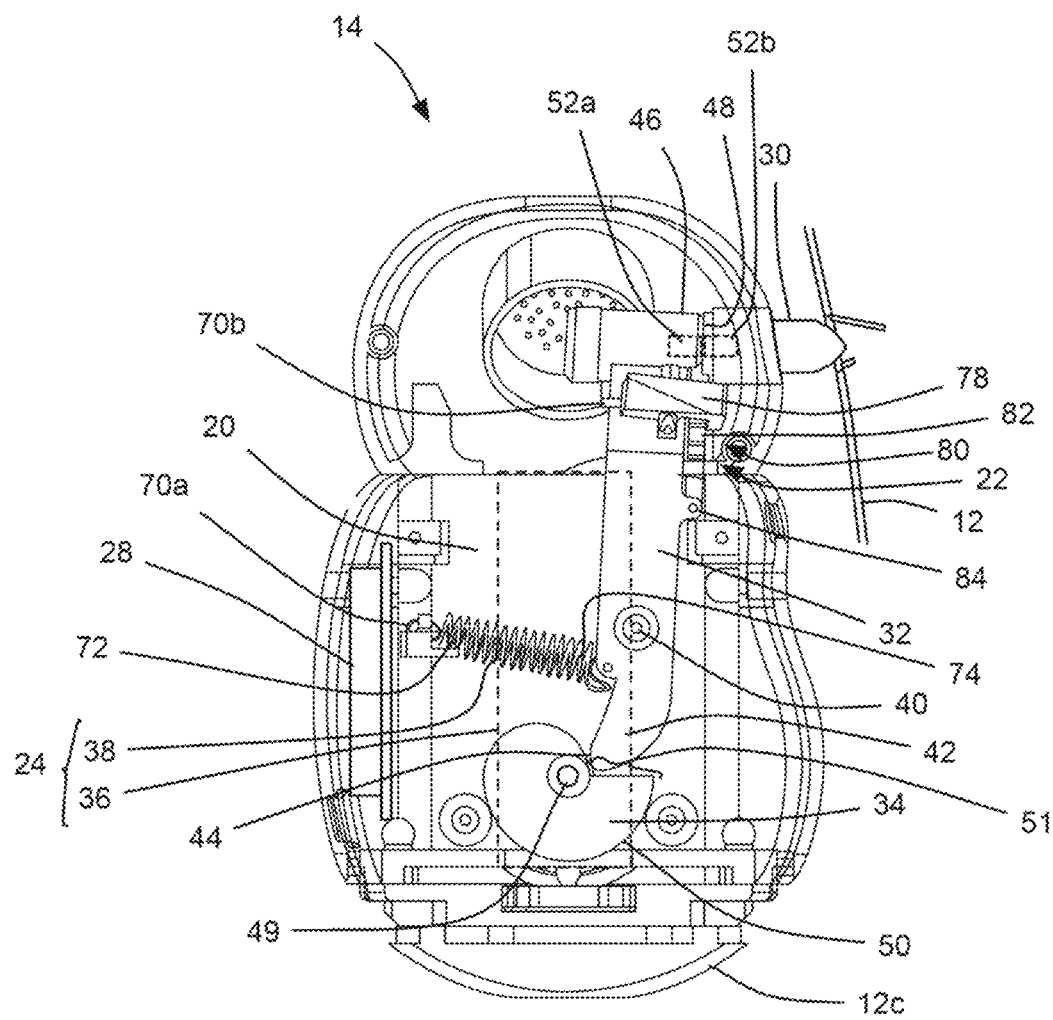
FIG. 5 is a sectional side view of the toy character shown in FIG. 2, in a pre-breakout position, after engagement of a hammer that is part of a breakout mechanism.

The toy character 14 is shown mounted only on the housing member 12c in FIG. 3. Referring to FIGS. 4 and 5, the toy character 14 includes a toy character frame 20, a breakout mechanism 22, a breakout mechanism power source 24 and a controller 28. The breakout mechanism 22 is operable to break the housing 12 (e.g. to fracture the housing 12 along at least one of the fracture paths 16) to expose the toy character 14. The breakout mechanism 22 includes a hammer 30, an actuation lever 32 and a breakout mechanism cam 34. The hammer 30 is movable between a retracted position (FIG. 4) in which the hammer 30 is spaced from the housing 12 and an advanced position (FIG. 5) in which the hammer 30 is positioned to break the housing 12.

The actuation lever 32 is pivotably mounted via a pin joint 40 to the toy character frame 20 and is movable between a hammer retraction position (FIG. 4) in which the actuation lever 32 is positioned to permit the hammer 30 to move to the retracted position, and a hammer driving position (FIG.

5) in which the actuation lever 32 drives the hammer 30. The actuation lever 32 is biased towards the hammer driving position by an actuation lever biasing member 38. In other words, the actuation lever 32 is biased by the biasing member 38 towards driving the hammer 30 to the extended position. The actuation lever 32 has a first end 42 with a cam engagement surface 44 thereon, and a second end 46 with a hammer engagement surface 48 thereon, which will be described further below.

The breakout mechanism cam 34 may sit directly on an output shaft (shown at 49) of a motor 36 and is thus rotatable by the motor 36. The breakout mechanism cam 34 has a cam surface 50 that is engaged with the cam engagement surface 44 on the first end 42 of the actuation lever 32. When the breakout mechanism cam 34 is rotated by the motor 36 (in the clockwise direction in the views shown in FIGS. 4 and 5), from the position shown in FIG. 4 to the position shown in FIG. 5) a stepped region shown at 51 on the cam surface 50 causes the cam surface 50 to drop away from the actuation lever 32 abruptly, permitting the biasing member 38 to accelerate the actuation lever 32 to impact at relatively high speed with the hammer 30, thereby driving the hammer 30 forward (outward) from the frame 20 at relatively high speed, which provides a high impact energy when the hammer 30 hits the housing 12, so as to facilitate breaking of the housing 12. In some embodiments, this will present the appearance of a bird pecking its way out of an egg.

As the breakout mechanism cam 34 continues to rotate, the cam surface 50 draws the actuation lever 32 back to the retracted position that is shown in FIG. 4. The hammer engagement surface 48 of the actuation lever 32 may have a first magnet 52a there in that is attracted to a second magnet 52b in the hammer 30. As a result, during the drawing back of the actuation lever 32, the actuation lever 32 pulls the hammer 30 back to a retracted position shown in FIG. 4.

The breakout mechanism cam 34 is rotatable by the motor 36 to cyclically cause retraction of the actuation lever 32 from the hammer 30 and then release of the actuation lever 32 to be driven into the hammer 30 by the actuation lever biasing member 38. Thus, the motor 36 and the actuation lever biasing member 38 may together make up the breakout mechanism power source 24.

The breakout mechanism biasing member 38 may be a helical coil tension spring as shown in the figures, or alternatively it may be any other suitable type of biasing member.

Figure 6:
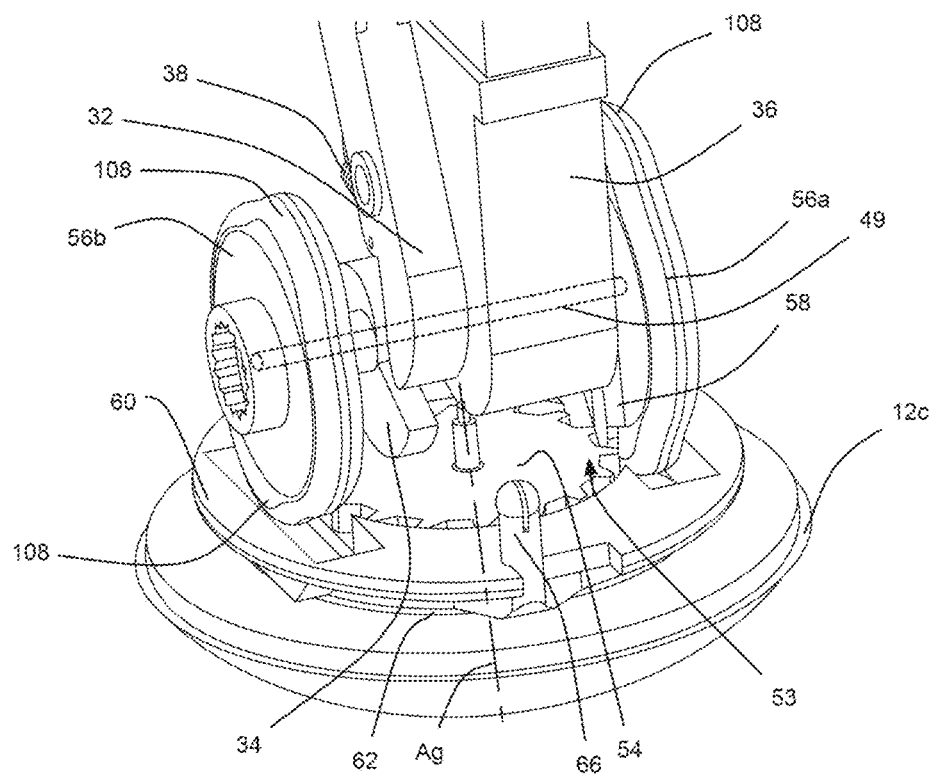
FIG. 6 is a perspective view of a portion of the toy character that causes rotation of the toy character inside the housing.

Additionally, the toy character 14 includes a rotation mechanism shown at 53 in FIG. 6. The rotation mechanism 53 is configured to rotate the toy character 14 in the housing 12. The controller 28 is configured to operate the rotation mechanism 53 when operating the breakout mechanism in order to break the housing 12 in a plurality of places.

Figure 6A:
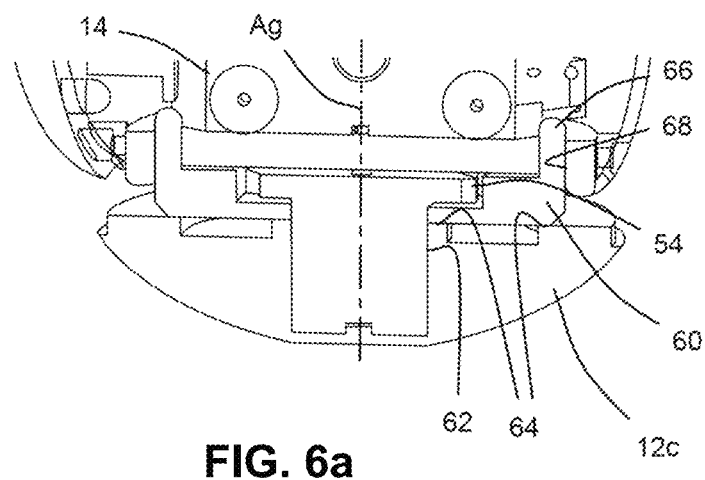
FIG. 6a is a sectional side view of the portion of the toy character shown in FIG. 6.

The rotation mechanism 53 may be any suitable rotation mechanism. In the embodiment shown in FIG. 6, the rotation mechanism 53 includes a gear 54 that is fixedly mounted to the bottom housing member 12c. The output shaft 49 of the motor 36 is a dual output shaft that extends from both sides of the motor 36 and drives first and second wheels 56a and 56b. On one of the wheels, (in the example shown, on the first wheel 56a) is a drive tooth 58. When the motor 36 turns the output shaft 49, the drive tooth 58 on the first wheel 56a engages the gear 54 once per revolution of the output shaft 49 and drives the toy character 14 to rotate relative to the housing 12. A bushing 60 supports the toy character 14 for rotation about the axis (shown at Ag) of the gear 54. In the example shown, the bushing 60 is slidably, rotatably engaged with a shaft 62 of the gear 54, and is axially supported on support surface 64 of the bottom housing member 12c, as shown in FIG. 6a. The toy character 14 may be releasably held to the bushing 60 via projections 66 on the bushing 60 that engage apertures 68 on the toy character frame 20. When the toy character 14 is desired to be removed from the bushing 60, a user may pull the toy character 14 off of the projections 66. The bushing 60 also supports the wheels 56a and 56b off of the housing 12. As a result, while the toy character 14 is in the housing 12, rotational indexing of the toy character 14 takes place by sliding of the bushing 60 on the bottom housing member 12c and without engagement of the wheels 56a and 56b on the housing member 12c.

As can be seen from the description above, once per revolution of the output shaft 49, the rotation mechanism 53 rotates the toy character 14 by a selected angular amount (i.e. the rotation mechanism 53 rotationally indexes the toy character 14), and the actuation lever 32 is drawn back to a retracted position and then released to drive the hammer 30 forward to engage and break the housing 12. Thus, continued rotation of the motor 36 causes the toy character 14 to eventually break through the entire perimeter of the housing 12.

Figure 7:
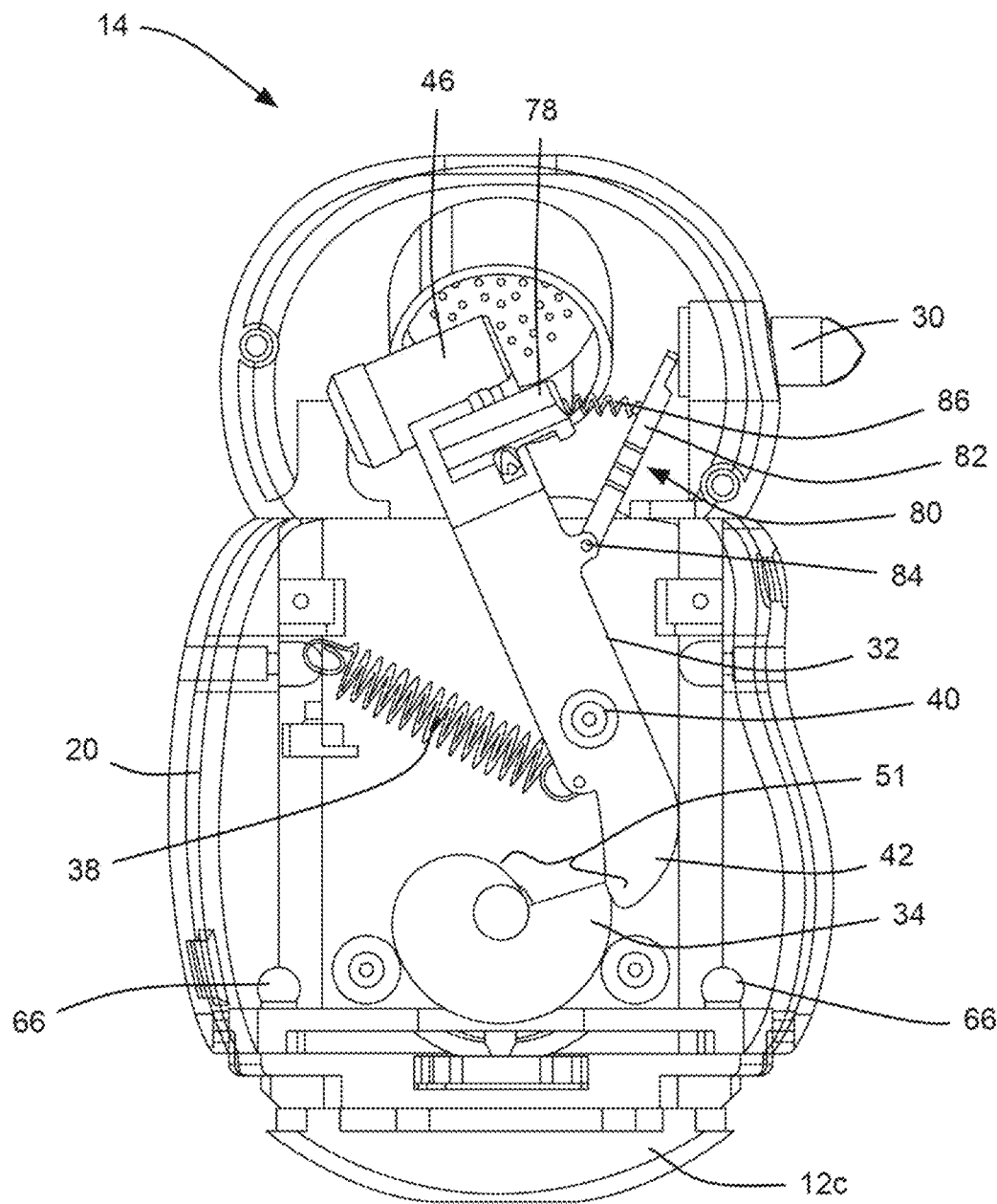
FIG. 7 is a sectional side view of the toy character shown in FIG. 2, in a post-breakout position, showing the hammer extended.

Once the toy character 14 has broken through the housing 12, a user can help to free the toy character 14 from the housing 12. It will be noted that the housing member 12c may be left to serve as a base for the toy character 14 if desired in some embodiments. Once the toy character 14 is freed from the housing 12 and the hammer 30 is no longer needed to break through the housing 12, the user may move at least one release member from a pre-breakout position to a post-breakout position. In the example shown in FIG. 5, there are two release members, namely a first release member 70a, and a second release member 70b. Prior to breaking of the housing 12 to expose the toy character 14, the release members 70a and 70b are in the pre-breakout position. When in the pre-breakout position, the first release member 70a connects the first end (shown at 72) of the actuation lever biasing member 38 to the toy character frame 20. The second end (shown at 74) of the biasing member 38 is connected to the actuation lever 32, and therefore, the biasing member 38 is connected to drive the hammer 30 forward (via actuation of the actuation lever 32) to break the housing 12. Movement of the release member 70a to the post-breakout position in the example shown, entails removal of the release member 70a such that the biasing member 38 is disabled from driving the actuation lever 32 and therefore the hammer 30, as shown in FIG. 7. As a result, when the motor 36 rotates, which causes rotation of the breakout mechanism cam 34, the passing of the stepped region 51 of the cam surface 50 does not cause the actuation lever 32 to be driven into the hammer 30.

Figure 8:
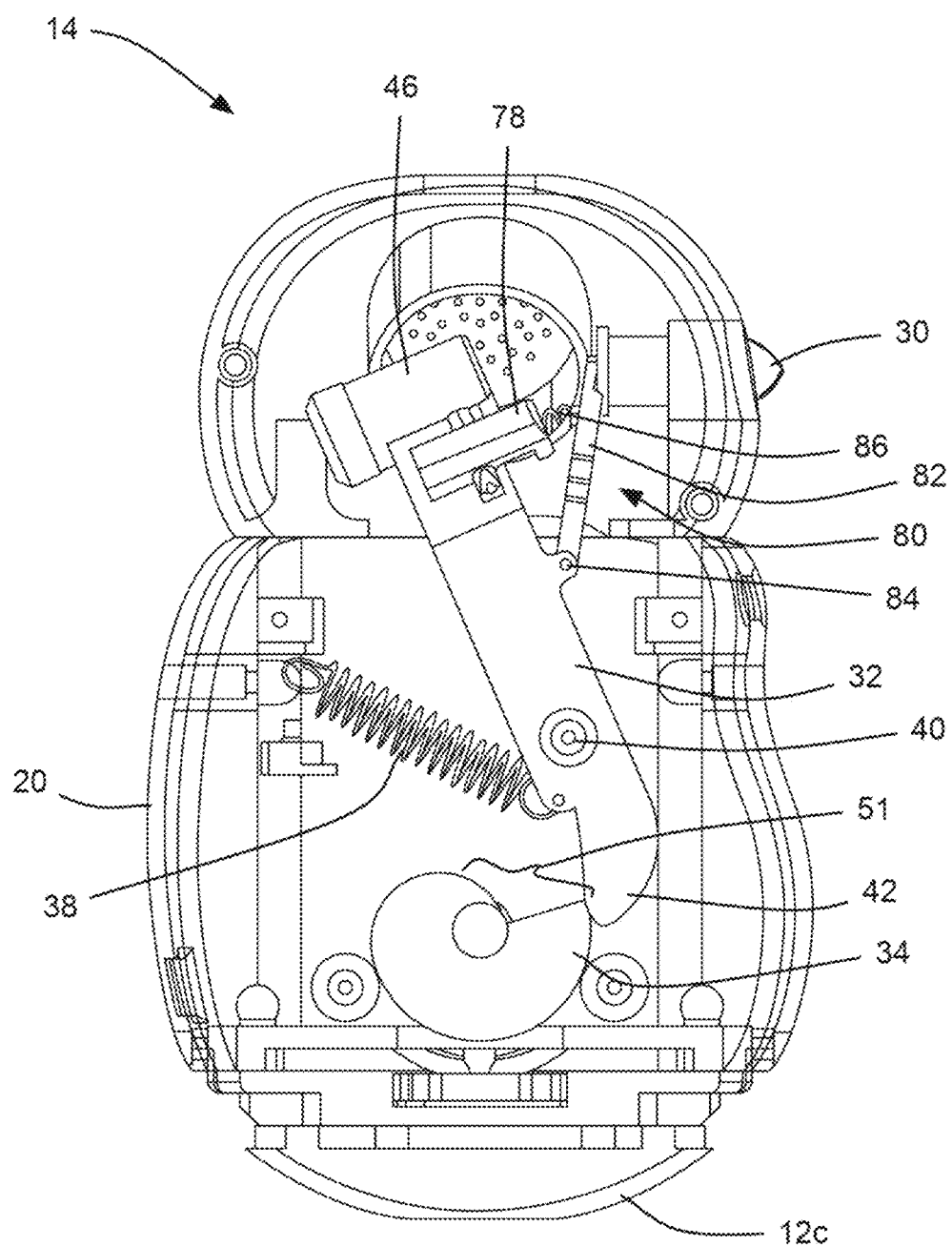
FIG. 8 is a sectional side view of the toy character shown in FIG. 2, in a post-breakout position, showing the hammer retracted.

With reference to FIG. 4, the second release member 70b, when in the pre-breakout position, holds a locking lever 78 in a locking position so as to hold a hammer biasing structure 80 in a non-use position. In the non-use position the hammer biasing structure 80 is fixedly held to the actuation lever 32 and acts as one with the actuation lever 32. With reference to FIGS. 7 and 8, when the second release member 70b is moved from the pre-breakout position to the post-breakout position, the locking lever 78 releases the hammer biasing structure 80. The hammer biasing structure 80 includes a pivot arm 82 that is pivotally connected to the actuation lever 32 (e.g. via a pin joint 84), and a pivot arm biasing member 86 that may be a compression spring or any other suitable type of spring that acts between the actuation lever 32 and the pivot arm 82 so as to urge the pivot arm 82 into the hammer 30 to urge the hammer 30 towards the extended position shown in FIG. 7. As a result, the hammer 30 can integrate into the toy character's appearance. In the embodiment shown, wherein the toy character 14 is in the form of a bird, the hammer 30 is the beak of the bird. Because the hammer 30 is urged outwards by the biasing member 86 and is not locked in the extended position, it may be pushed in against the biasing force of the biasing member 86 by an external force (e.g. by the user), as shown in FIG. 8, which can reduce the risk of a poking injury to a child playing with the toy character 14.

Figure 9:
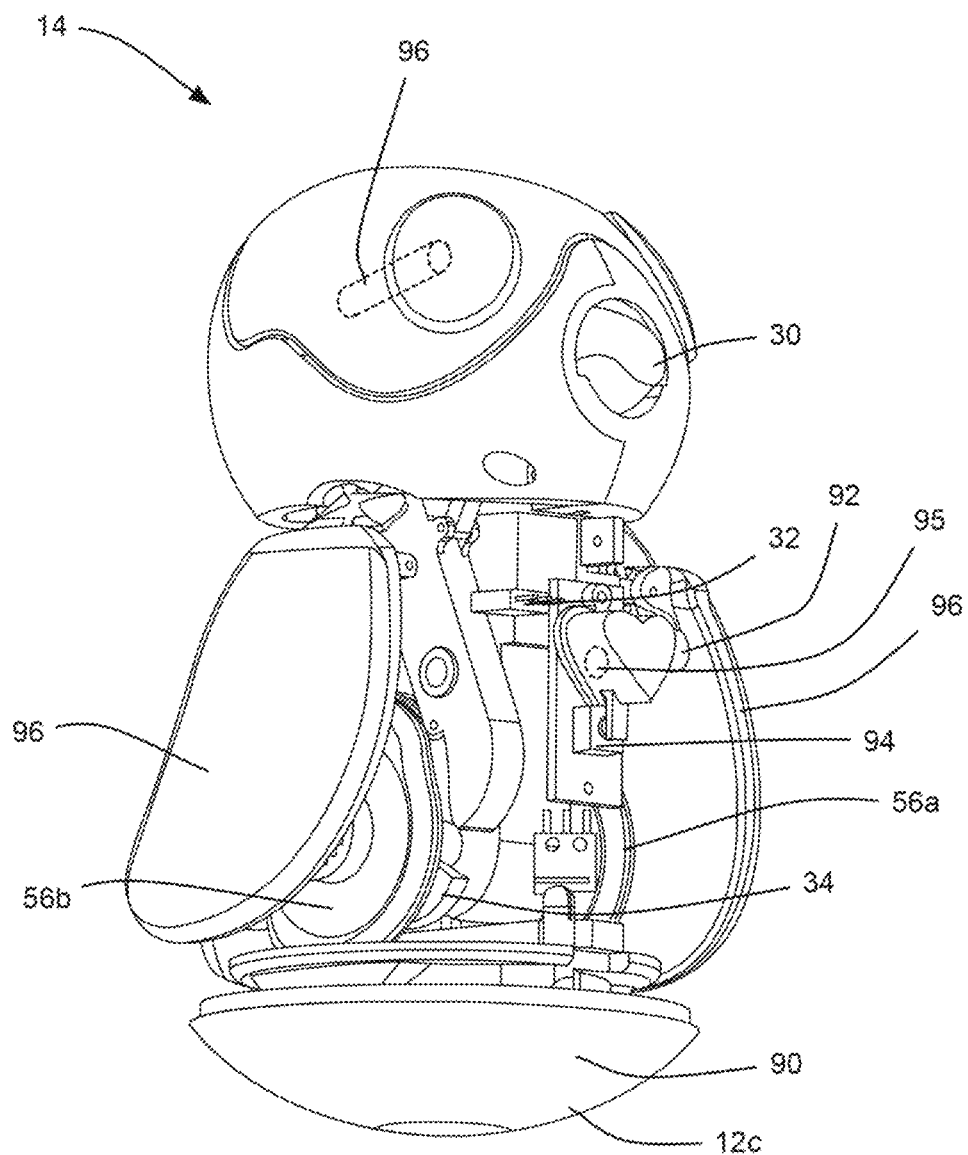
FIG. 9 is a perspective view of a portion of the toy character assembly shown in FIGS. 1a and 1b, showing sensors that are part of the toy character assembly.

Any suitable scheme may be used to initiate breaking out of the housing 12 by the toy character 14. For example, as shown in FIG. 9, at least one sensor may be provided in the toy character assembly 10 which detects interaction with a user while the toy character 14 is in the housing 12. For example, a capacitive sensor 90 may be provided on the bottom of the housing member 12c so as to detect holding by a user. A microphone 92 may be provided on the toy character frame 20 to detect audio input by a user. A pushbutton 94 may be provided on the front of the toy character 14. A tilt sensor 96 may be provided on the toy character 14 to detect tilting of the toy character 14 by the user. The controller 28 may count the number of interactions that a user has had with the toy character assembly 10 and operate the breakout mechanism 22 so as to break the housing 12 and expose the toy character 14 if a selected condition is met. For example, the condition may be a selected number of interactions with a user, such as 120 interactions. Interaction with the toy character 14 using the microphone 92 could entail the user saying a command that is recognized by the controller 28, or alternatively it could entail the user making any kind of noise such as a clap or a tap, which would be received by the microphone 92. An interaction could entail the user holding or touching the housing 12 in places where the capacitive sensor will receive it. In another example, an interaction could entail the user pushing the pushbutton 94 of the toy character 14 by pressing on the correct spot on the housing 12, which may be sufficiently flexible and resilient to transmit the force of the press through to the pushbutton 94. The pushbutton 94 may control operation of an LED 95 that is inside the toy character 14 and is sufficiently bright to view through the housing 12. The LED 95 may illuminate in different colours (controlled by the controller 28) to indicate to the user the 'mood' of the toy character 14, which may depend on factors including the interactions that have occurred between the toy character 14 and the user.

Figure 10A:
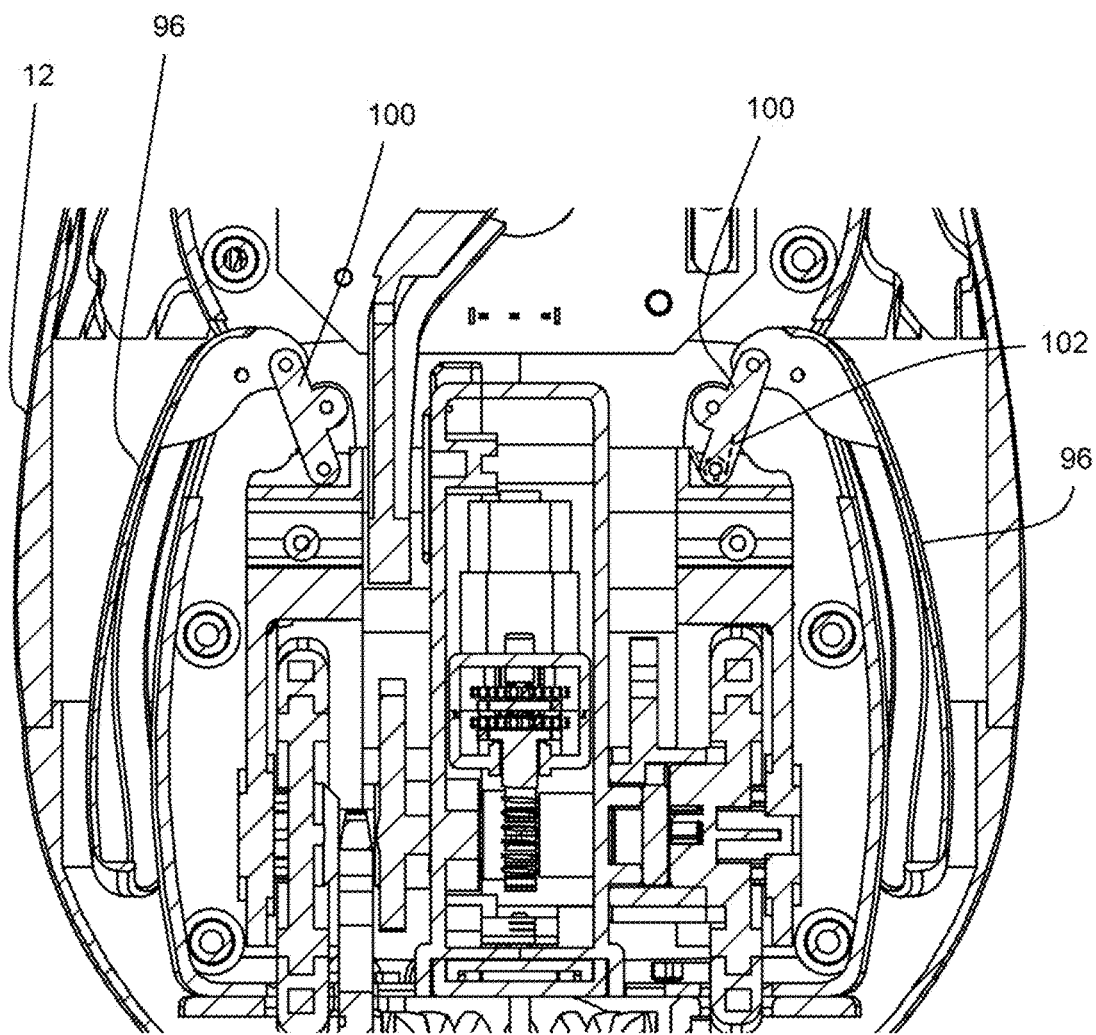
FIG. 10a is a front elevation view of a portion of the toy character assembly, illustrating a limb of the toy character in a non-functional, pre-breakout position as it is positioned when inside the housing.
Figure 10B:
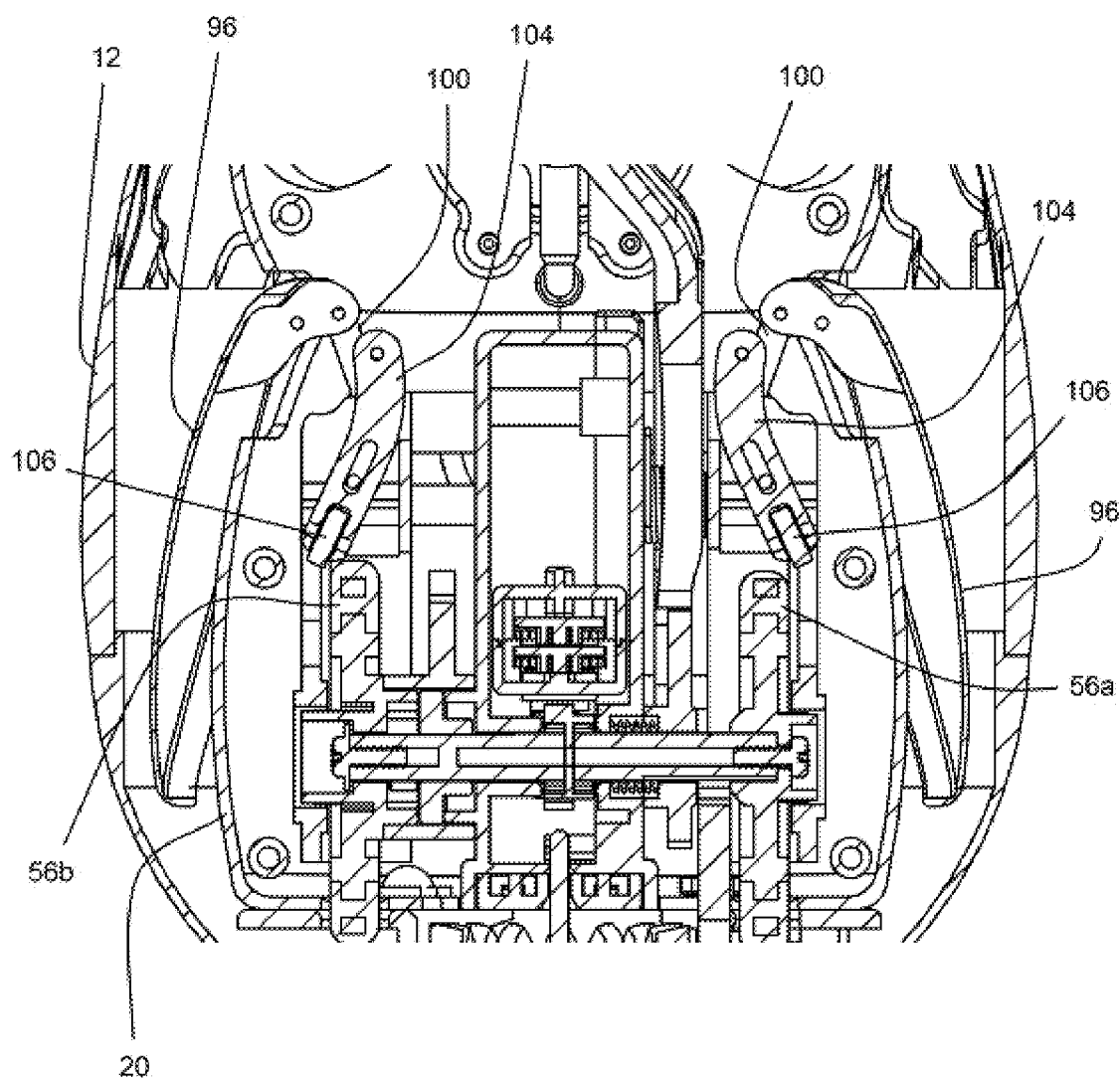
FIG. 10b is a rear perspective view of the portion of the toy character assembly, further illustrating the limb of the toy character in the non-functional, pre-breakout position as it is positioned when inside the housing.
Figure 10C:
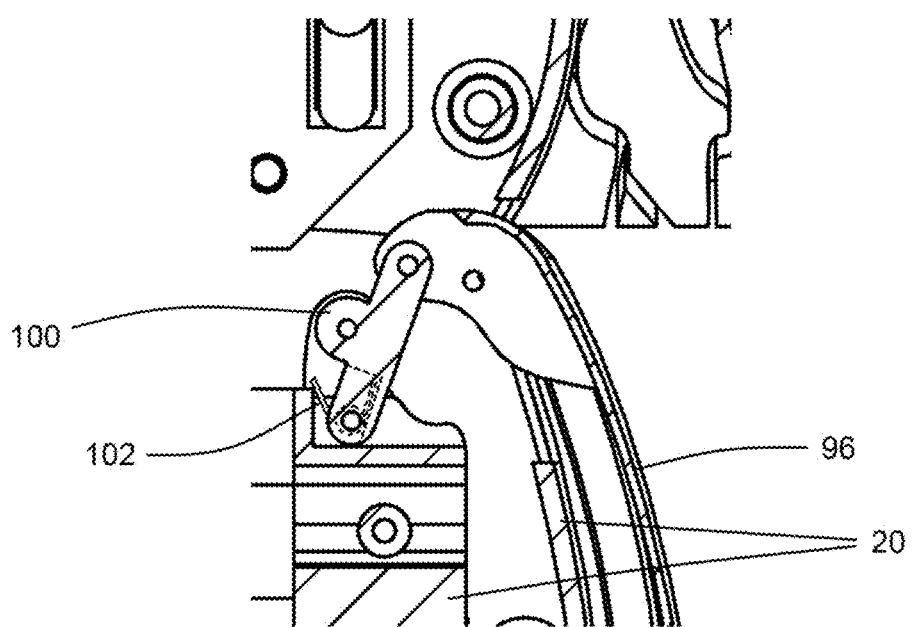
FIG. 10c is a magnified front elevation view of a joint between a limb and a character frame of the toy character.
Figure 10D:
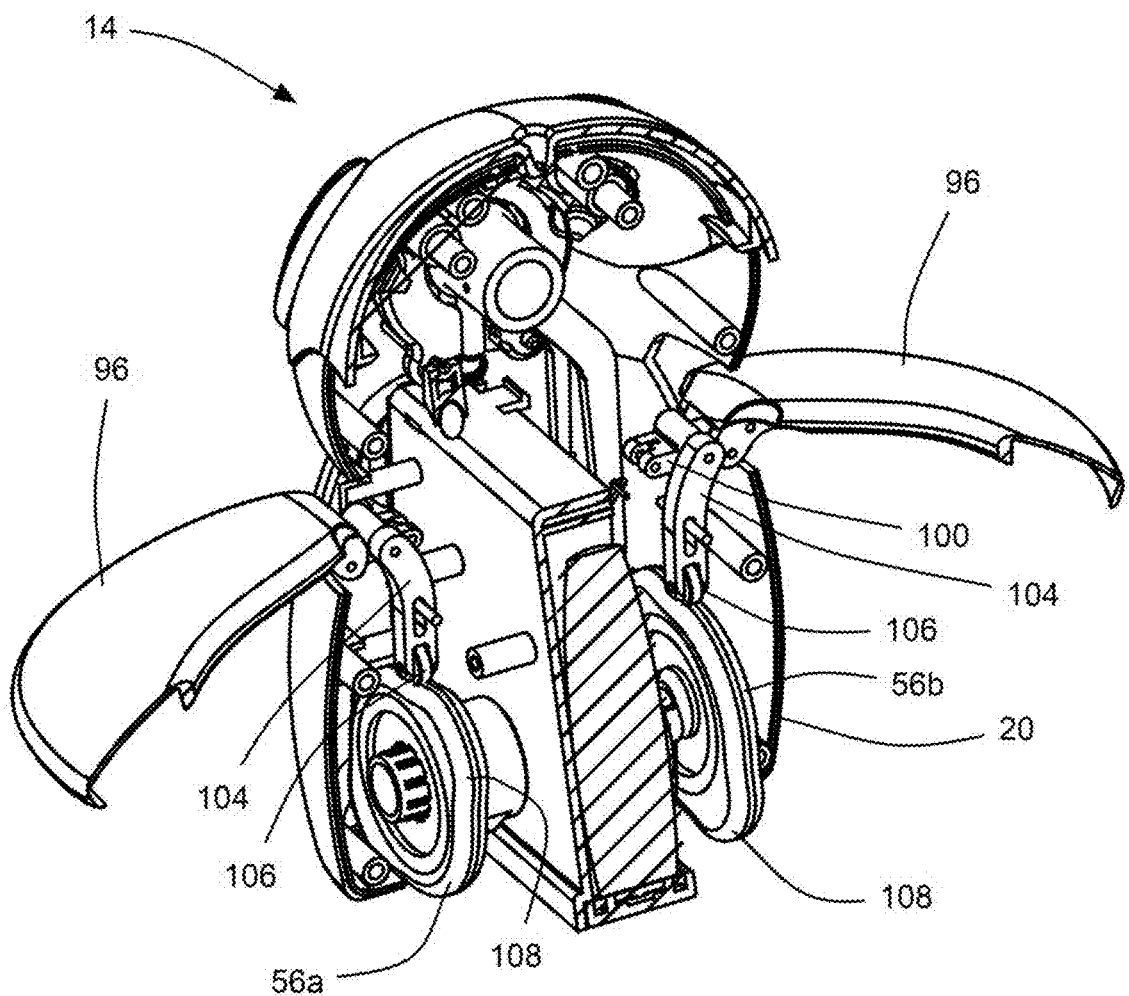
FIG. 10d is a perspective view of the portion of the toy character assembly illustrating the limb of the toy character in the functional, post-breakout position as it is position when outside the housing.

When the toy character 14 is outside of the housing 12, the toy character 14 may carry out movements that are different than those carried out inside the housing 12. For example, the toy character 14 may have at least one limb 96. In the example shown, there are provided two limbs 96 which are shown as wings but which may be any suitable type of limb. When inside the housing, the wings 96 are positioned in a pre-breakout position in which they are non-functional, as shown in FIGS. 10a, 10b and 10c, and, when outside the housing, are positioned in a post-breakout position in which they are functional, as shown in FIG. 10d. As shown in FIG. 10d, the wings 96 are connected to the character frame 20 via a wing connector link 100 that is pivotally mounted at one end to the associated wing 96 and at another end to the character frame 20. For each wing 96, a wing driver arm 104 is pivotally connected at one end to the associated wing 96 and has a wing driver arm wheel 106 at the other end. The wing driver arm wheels 106 rest on the toy character's main wheels 56a and 56b when the toy character 14 is in the post-breakout position. The toy character's main wheels 56a and 56b have a cam profile on them with at least one lobe 108 on each wheel (shown in FIG. 6, in which two lobes 108 are provided on each wheel). The lobes 108 serve two purposes. Firstly, as the motor 36 turns, the wheels 56a and 56b drive the toy character 14 along the ground, and the lobes 108 lend a wobble to the toy character 14 to give it a more lifelike appearance when it rolls along the ground. Secondly, as the wheels 56a and 56b turn, the presence of the lobes 108 cause the wheels 56a and 56b to act as wing driver cams, which drive the wing driver arms 104 up and down as the wing driver arm wheels 106 follow the cam profiles of the main wheels 56a and 56b. The up and down movement of the wing driver arms 104 in turn, drives the wings 96 to pivot up and down, giving the toy character 14 the appearance of flapping its wings as it travels along the ground. Preferably, the lobes 108 on the first wheel 56a are offset rotationally relative to the lobes 108 on the second wheel 56b so that the toy character 14 has a side-to-side wobble as the toy character rolls to enhance the lifelike appearance of its motion.

For each wing connector link 100, a wing connector link biasing member 102 (FIG. 10c) biases the associated wing connector link 100 to urge the associated wing 96 downward to maintain contact between the driver arm wheels 106 and the main wheels 56a and 56b when the character is in the post-breakout position shown in FIG. 10d.

In the example shown, where the limbs 96 are wings, the driver arms 104 are referred to as wing driver arms, the driver arm wheels 106 are referred to as wing driver arm wheels 106 and the wheels 56a and 56b are referred to as wing driver cams. However, it will be understood that if the wings 96 were any other suitable type of limbs, the driver arms 104 and the driver arm wheels 106 may more broadly be referred to as limb driver arms 104 and limb driver arm wheels 106 respectively, and the wheels 56a and 56b may be referred to as limb driver cams.

The motor 36 drives the limbs 96 in the example shown, by driving the wheels 56a and 56b. Thus, when the limbs 96 are in the post-breakout position, the motor 36 is operatively connected to the limbs 96.

The motor 36 is thus the limb power source. However the motor 36 is just an example of a suitable limb power source, and alternatively any other suitable type of limb power source could be used to drive the limbs 96.

When the wings 96 are in the pre-breakout position (FIGS. 10a-10c), the links 100 may hinge relative to the character frame 20 as needed so that the wings fit within the confines of the housing 12. In the example shown the wing connector links 100 hinge upwardly against the biasing force of the biasing members 102. While in the housing 12, the wings 96 thus remain in their non-functional position wherein the wing driver arms 104 are held such that the wing driver arm wheels 106 are disengaged from the toy character's main wheels 56a and 56b. Thus, the motor 36 (i.e. the limb power source) is operatively disconnected from the limbs 96 when the limbs 96 are in the pre-breakout position. As a result, when the toy character 14 is in the housing 12 and the motor 36 rotates (e.g. to cause movement of the breakout mechanism 22), the rotation of the main wheels 56a and 56b does not cause movement of the wings 96. As a result, the wings 96 do not cause damage to the housing 12 during operation of the motor 36 while the character 14 is in the housing 12.

The motor 36 depicted in the figures includes an energy source, which may be one or more batteries.

Figure 11:
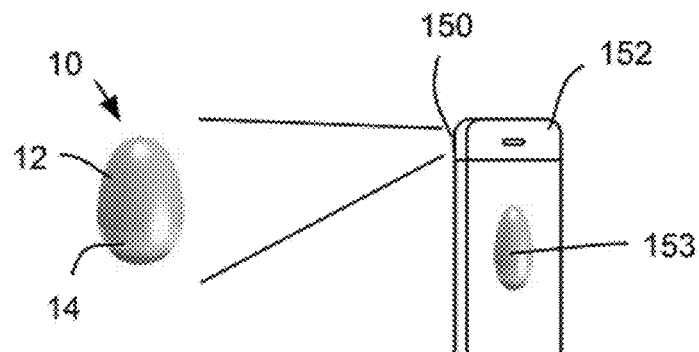
FIG. 11 is a perspective view of the toy character assembly and an electronic device used to scan the toy character assembly.

Reference is made to FIG. 11, which illustrates a way that a user can play with the toy character assembly 10 prior to breakout of the toy character 14 from the housing 12. The lower housing member 12b is shown as transparent in FIG. 11 to show the toy character 14 inside. At a first point in time, the user may scan the toy character assembly 10 by any suitable means, such as by a camera 150 on a smartphone 152 to produce a first progress scan 153 of the toy character assembly 10 (i.e. which may be an image of the toy character assembly 10 taken from the smartphone camera 150). The user may then upload the scan 153 to a server 154 as part of, or after, registering the toy character assembly 10 via a network such as the internet, shown at 156. The server 156 may, in response to the uploaded scan, generate an output image 158a representing a first virtual stage of development of the toy character 14 in the housing 12, so as to convey the impression to the user that the toy character 14 is a living entity growing inside the housing 12. The output image 158a may be displayed electronically (e.g. on the smartphone 152). The user may at a second, later point in time take a second progress scan 153 of the toy character assembly 10 and may upload it to the server 154, whereupon the server 154 will generate a second output image 158b (shown in FIG. 13b) that represents a second virtual stage of development of the toy character 14 inside the housing 12. In the second virtual stage of development the toy character 14 may appear to be further developed than in the first virtual stage of development.

Figure 12:
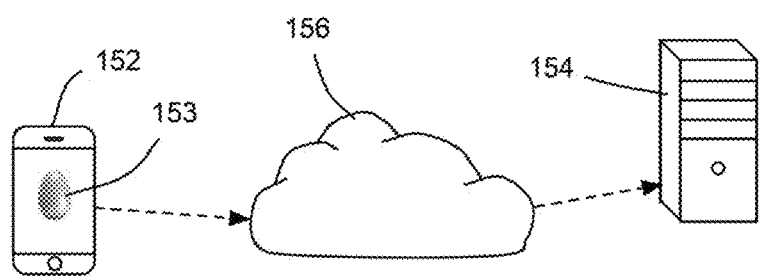
FIG. 12 is a schematic view illustrating the uploading the scan of the toy character assembly to a server.
Figure 13A:
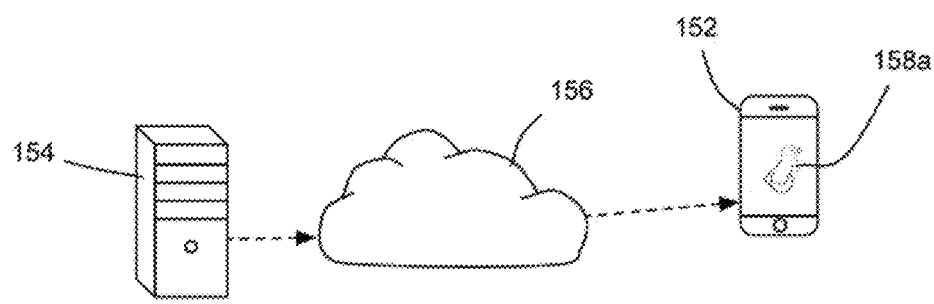
FIG. 13a is a schematic view illustrating transmitting an output image from the server to be displayed electronically showing a first virtual stage of development for the toy character.
Figure 13B:
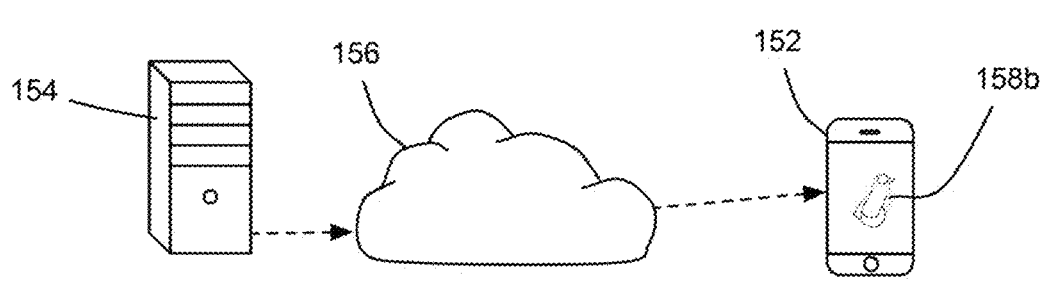
FIG. 13b is a schematic view illustrating transmitting an output image from the server to be displayed electronically showing a second virtual stage of development for the toy character.
Figure 14:
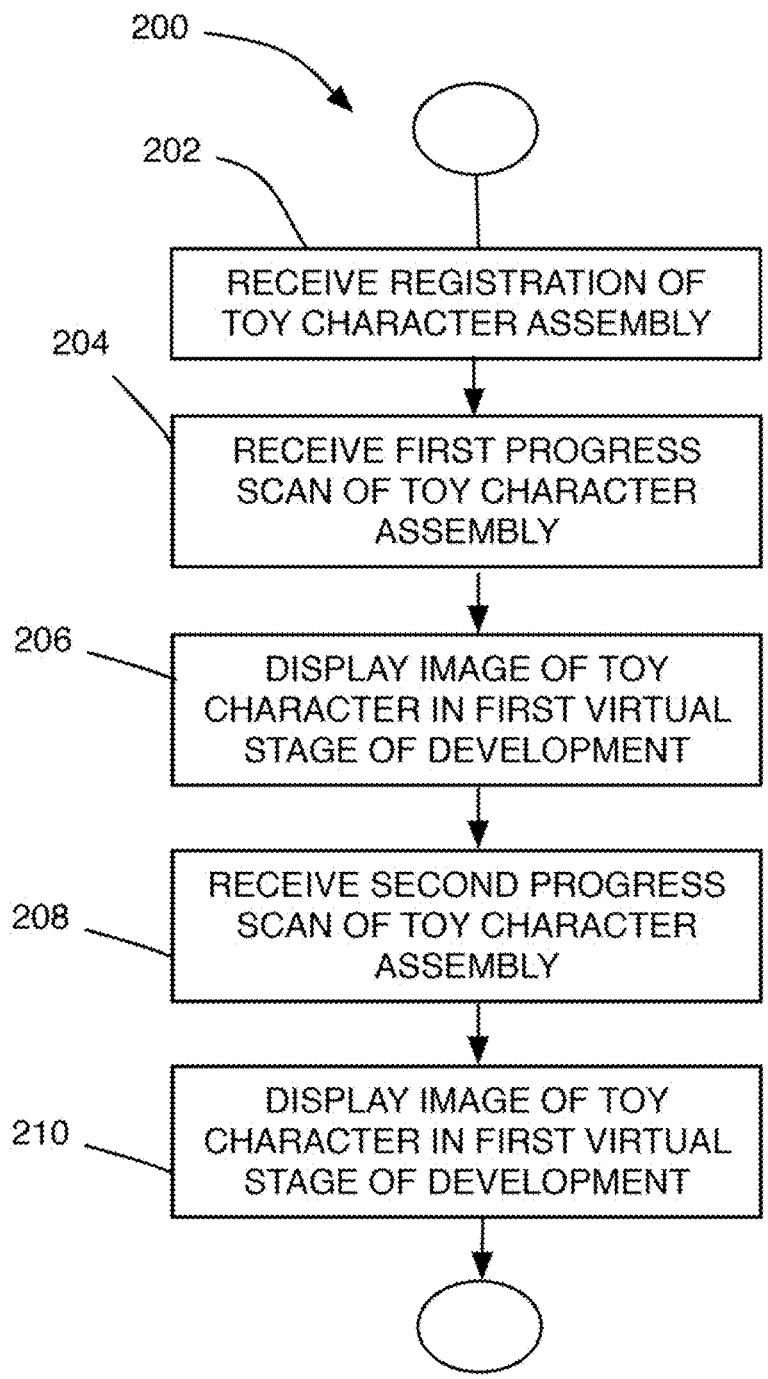
FIG. 14 is a flow diagram of a method of receiving the scan from the electronic device and depicting the toy character based on steps illustrated in FIGS. 11 and 13.

FIG. 14 is a flow diagram of a method 200 of managing an interaction between a user and the toy character assembly 10 in accordance with the actions depicted in FIGS. 11-13. The method 200 begins at 201, and includes a step 202 which is receiving from the user a registration of the toy character assembly 14. This may take place by receiving from a user, information regarding the model number or serial number of the toy character assembly 14. Step 204 includes receiving from the user after step 202, a first progress scan of the toy character assembly, as depicted in FIG. 12. Step 206 includes displaying an image of the toy character 14 in a first stage of virtual development, as depicted in FIG. 13a. Step 208 includes receiving from the user after step 206, a second progress scan of the toy character assembly 10, as depicted in FIG. 12 again. Step 210 includes displaying a second output image 158b of the toy character 14 in a second stage of virtual development that is different than the first output image 158a depicting the first stage of development, as shown in FIG. 13b.

While it has been described for the toy character assembly 10 to include a controller and sensors, and to include the breakout mechanism inside the toy character 14, many other configurations are possible. For example, the toy character assembly 10 could be provided without a controller or any sensors. Instead the toy character 14 could be powered by an electric motor that is controlled via a power switch that is actuatable from outside the housing 12 (e.g. the switch may be operated by a lever that extends through the housing 12 to the exterior of the housing 12).

The breakout mechanism 22 has been shown to be provided inside the toy character 14. It will be understood that this location is just an example of a location in association with the housing 12 in which the breakout mechanism 22 can be positioned. In other embodiments, the breakout mechanism can be positioned outside the housing 12, while remaining in association with the housing 12. For example, in embodiments in which the housing 12 is shaped like an egg (as is the case in the example shown in the figures), a 'nest' can be provided, which can hold the egg. The nest may have a breakout mechanism built into it that is actuatable to break the egg to reveal the toy character 14 within. Thus, in an aspect, a toy character assembly may be provided, that includes a housing, such as the housing 12, a toy character inside the housing, that is similar to the toy character 14 but wherein a breakout mechanism is provided that is associated with the housing, whether the breakout mechanism is within the housing or outside of the housing, or partially within and partially outside of the housing, and that is operable to break the housing 12 to expose the toy character 14. The breakout mechanism is powered by a breakout mechanism power source (e.g. a spring, or a motor) that is associated with the housing 12. In some embodiments (e.g. as shown in FIG. 3), the breakout mechanism includes a hammer (such as the hammer 30), which the breakout mechanism power source is operatively connected to, so as to drive the hammer to break the housing 12. In some embodiments (e.g. as shown in FIG. 4), the breakout mechanism power source is operatively connected to the hammer to reciprocate the hammer to break the housing 12.

Another aspect of the invention relates to the movement of the toy character 14 when in the pre-breakout position and when in the post-breakout position. More specifically, the toy character 14 may be said to include a functional mechanism set that includes all of the movement elements of the toy character 14, including, for example, the limbs 96, the main wheels 56, the limb connector links 100 and associated biasing members 102, the limb driver arms 104, the driver arm wheels 106, the hammer 30, the actuation lever 32, the breakout mechanism cam 34, the motor 36 and the actuation lever biasing member 38. The toy character 14 is removable from the housing 12 and is positionable in a post-breakout position. When the toy character 14 is in the pre-breakout position, the functional mechanism set is operable to perform a first set of movements. In the example shown, the limb power source (i.e. the motor 36) is operatively disconnected from the limbs 96, and so movement of the limb power source 36 does not drive movement of the limbs 96. However, in the pre-breakout position, the breakout mechanism power source drives movement of the breakout mechanism 22 (by reciprocating the hammer 30 and indexing the toy character 14 around in the housing 12) so as to break the housing 12 and expose the toy character 14. When the toy character 14 is in the post-breakout position, the functional mechanism set is operable to perform a second set of movements that is different than the first set of movements. For example, when the toy character 14 is in the post-breakout position the limb power source 36 is operatively connected to the limbs 96 and can drive movement of the limbs 96, but the breakout mechanism 22 is not driven by the breakout mechanism power source.

Some optional aspects of the play pattern for the character toy assembly are described below. While the toy character 14 is in the housing 12 (when the toy character 14 is still in the pre-break out stage of development), the user can interact with the toy character in several ways. For example, the user can tap on the housing 12. The tapping can be picked up by the microphone on the toy character 14. The controller 28 can interpret the input to the microphone, and, upon determining that the input was from a tap, the controller 28 can output a sound from the speaker that is a tap sound, so as to appear as if the toy character 14 is tapping back to the user. Alternatively, or additionally, the controller 28 may initiate movement of the hammer 30 as described above, depending on whether the controller 28 can control the speed of the hammer 30, so as to knock the hammer 30 against the interior wall of the housing 12, lightly enough that it can be sensed by the user, but not so hard that it risks breaking the housing 12. The controller 28 may be programmed (or otherwise configured) to emit sounds indicating annoyedness in the event that the user taps too many times within a certain amount of time or according to some other criteria. Optionally, if the user turns the toy character assembly 10 upside down a first time, the controller 28 may be programmed to emit a 'Weee!' sound from the speaker of the toy character 14. If the user turns the toy character assembly 10 upside down more than a selected number of times within a certain period of time, then the controller 28 may be programmed to emit a sound (or some other output) that indicates that the toy character 14 is queasy. Optionally, when the controller 28 detects, via the capacitive sensors, that the user is holding the housing 12, the controller 28 may be programmed to emit a heartbeat sound from the toy character 14. Optionally, the controller 28 may be configured to indicate that it is cold using any suitable criteria and may be programmed to stop indicating that it is cold when the controller 28 detects that the user is holding or rubbing the housing 12. Optionally, the controller 28 is programmed to emit sounds indicating that the toy character 14 has the hiccups and to stop indicating this upon receiving a sufficient number of taps from the user. The controller 28 may be programmed to indicate to the user that the toy character 14 is bored and would like to play and may be programmed to stop such indication when the user interacts with the toy character assembly 10.

Optionally, when the controller 28 has determined that the criteria have been met for it to leave the pre-break out stage of development and break out of the housing 12, the controller 28 may cause the LED to flash a selected sequence. For example, the LED may be caused to flash a rainbow sequence (red, then orange, then yellow, then green, then blue, then violet). After this, the toy character 14 may begin hitting the housing 12 a selected number of times, after which it may stop and wait for the user to interact further with it before beginning to hit the housing 12 again by a selected number of times.

Optionally, after the toy character 14 has initially broken out of the housing 12, the controller 28 may be programmed to act in a first stage of development after 'hatching' (i.e. after the toy character 14 is released from the housing 12) to emit sounds that are baby-like and to move in a baby-like manner, such as for example only being able to spin in a circle. During this first stage, the controller 28 may be programmed to require the user to interact with the toy character 14 in selected ways that symbolize petting of the toy character 14, feeding the toy character 14, burping the toy character 14, comforting the toy character 14, caring for the toy character 14 when the toy character 14 emits output that is indicative of being sick, putting the toy character 14 down for a nap, and playing with the toy character 14 when the toy character 14 emits output that is indicative of being bored. In this first stage, the toy character 14 may emit output that indicates fear from sounds beyond a selected loudness. In this stage, the toy character may generally emit baby-like sounds, such as gurgling sounds when the user attempts to communicate with it verbally.

Optionally, after some criteria are met during the first stage (e.g. a sufficient amount of time has passed, or a sufficient number of interactions (e.g. 120 interactions) have passed between the user and the toy character 14) the controller 28 may be programmed to change its mode of operation to a second stage after 'hatching' (i.e. after the toy character 14 is released from the housing 12). Optionally, the LED will emit the rainbow sequence again to indicate that the criteria have been met and that the toy character is changing its stage of development.

In the second stage of development, the toy character 14 can move linearly as well as moving in a circle. Additionally, the sounds emitted from the toy character 14 may sound more mature. Initially in the second stage of development after hatching, the controller 28 may be programmed to drive the toy character 14 to move linearly, but not smoothly—the motor 38 may be driven and stopped in a random manner to give the appearance of a toddler learning to walk. Over time the motor 38 is driven with less stopping giving the toy character 14 the appearance of a more mature capability to 'walk'. In this second stage of development, the toy character 14 may be capable of emitting sounds at the cadence that the user used when speaking to the toy character 14. Also in this second stage of development, games involving interaction with the toy character 14 may be unlocked and played by the user.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A toy character assembly, comprising:
a housing;
a toy character inside the housing; and
a breakout member that is operable to break the housing to expose the toy character;
wherein the housing is formed from a composition comprising
15-24 weight-% ethylene-vinyl acetate;
1-5 weight-% zinc stearate; and
75-84 weight-% calcium carbonate.

2. A toy character assembly as claimed in claim 1, wherein the housing includes a plurality of fracture elements provided on a face thereof to facilitate fracture upon impact from the breakout member.

3. A toy character assembly as claimed in claim 2, wherein the fracture elements are formed in a breakage zone of the housing, and wherein the fracture elements are surrounded by a structural region.

4. A toy character assembly as claimed in claim 3, wherein the fracture elements define a region of reduced wall thickness compared to the wall thickness of the structural region.

5. A toy character assembly as claimed in claim 4, therein the wall thickness of the fracture elements is between 40 to 60% thinner compared to the wall thickness in the structural region.

6. A toy character assembly as claimed in claim 3, wherein the fracture elements account for between 20 to 80% of the area within the breakage zone.

7. A toy character assembly as claimed in claim 3, wherein the fracture elements account for between 40 to 60% of the area within the breakage zone.

8. A toy character assembly as claimed in claim 3, wherein the fracture elements are provided in the form a plurality of fracture paths.

9. A toy character assembly as claimed in claim 8, wherein the fracture paths include a combination of continuous and discontinuous channels.

10. A toy character assembly as claimed in claim 8, wherein the fracture paths are continuous and positioned randomly in the breakage zone.

11. A toy character assembly as claimed in claim 8, wherein the fracture paths are continuous and arranged in a geometric pattern.

12. A toy character assembly as claimed in claim 8, wherein the fracture elements are provided in the form a plurality of discontinuous fracture units.

13. A toy character assembly as claimed in claim 12, wherein the fracture units are positioned randomly in the breakage zone.

14. A toy character assembly as claimed in claim 12, wherein the fracture units are positioned in a regular and repeating pattern in the breakage zone.

\* \* \* \* \*